(12) United States Patent
Yoshida et al.

(10) Patent No.: US 10,625,795 B2
(45) Date of Patent: Apr. 21, 2020

(54) RIDING WORK VEHICLE

(71) Applicant: Kubota Corporation, Osaka-shi (JP)

(72) Inventors: Tomohiro Yoshida, Sakai (JP); Ayaka Nakabayashi, Sakai (JP); Daisuke Tomimatsu, Sakai (JP); Koji Masumoto, Sakai (JP); Koji Kajino, Sakai (JP); Isamu Morimoto, Sakai (JP); Kyosuke Tanaka, Sakai (JP); Yoshiaki Niimoto, Sakai (JP); Hiroo Fujimoto, Sakai (JP); Masatoshi Watanabe, Sakai (JP); Shinji Kato, Sakai (JP); Yutaka Inubushi, Sakai (JP); Tatsuyuki Kashimoto, Sakai (JP)

(73) Assignee: Kubota Corporation, Osaka (JP)

( * ) Notice: Subject to any disclaimer, the term of this patent is extended or adjusted under 35 U.S.C. 154(b) by 109 days.

(21) Appl. No.: 15/762,835

(22) PCT Filed: Jun. 6, 2016

(86) PCT No.: PCT/JP2016/066770
§ 371 (c)(1),
(2) Date: Mar. 23, 2018

(87) PCT Pub. No.: WO2017/056563
PCT Pub. Date: Apr. 6, 2017

(65) Prior Publication Data
US 2018/0273119 A1    Sep. 27, 2018

(30) Foreign Application Priority Data

Sep. 29, 2015 (JP) .................................. 2015-192055
Sep. 29, 2015 (JP) .................................. 2015-192059

(51) Int. Cl.
*B60K 17/28* (2006.01)
*B62D 49/06* (2006.01)
(Continued)

(52) U.S. Cl.
CPC .......... *B62D 49/0692* (2013.01); *A01B 71/02* (2013.01); *B60K 17/28* (2013.01);
(Continued)

(58) Field of Classification Search
CPC ........ B60K 20/04; B60K 20/02; B60K 17/28; B62D 25/168; B62D 33/0625; B62D 49/0692; A01B 71/02; B60Y 2200/221
(Continued)

(56) References Cited

U.S. PATENT DOCUMENTS 6,112,139 A * 8/2000 Schubert ................. E02F 9/205
                                                        172/4.5
2005/0139034 A1   6/2005 Komine et al.
(Continued)

FOREIGN PATENT DOCUMENTS

JP         57-130722 U1    2/1956
JP         10121933 A      5/1998
(Continued)

*Primary Examiner* — Toan C To
(74) *Attorney, Agent, or Firm* — The Webb Law Firm

(57) ABSTRACT

It is contemplated to arrange a plurality of operational levers without inviting complications of the arrangements or enlargement of the vehicle body, intensively for better operability between the driver's seat and one of the right and left rear fenders. In a riding work vehicle, a plurality of operational levers 25, 26 are disposed adjacent on the right and left sides between a driver's seat and one of right and left rear fenders 7. Of the plurality of operational levers 25, 26, an inner operational lever 25 disposed on the side of the driver's seat is displaceable in a front-rear direction of a vehicle body. Of the plurality of operational levers 25, 26, an outer operational lever 26 disposed on the side of the rear fender has an entire grip portion 26A thereof disposed more upwardly of the vehicle body than a grip portion 25A of the inner operational lever 25, the outer operational lever being displaceable in the front-rear direction of the vehicle body (Continued)

between a first operational position on more vehicle body front side than an operational range of the inner operational lever 25 and a second operational position on more vehicle body rear side than the operational range of the inner operational lever 25, the outer operational lever being position-retainable at the first operational position and the second operational position, respectively.

10 Claims, 29 Drawing Sheets

(51) Int. Cl.
*B60K 20/02* (2006.01)
*A01B 71/02* (2006.01)
*B60K 20/04* (2006.01)
*B62D 25/16* (2006.01)
*B62D 33/06* (2006.01)

(52) U.S. Cl.
CPC .............. *B60K 20/02* (2013.01); *B60K 20/04* (2013.01); *B62D 25/168* (2013.01); *B62D 33/0625* (2013.01); *B60Y 2200/221* (2013.01)

(58) Field of Classification Search
USPC ...... 180/53.1, 53.6, 315, 322, 323, 324, 336
See application file for complete search history.

(56) References Cited

U.S. PATENT DOCUMENTS

| | | | |
|---|---|---|---|
| 2007/0285272 A1* | 12/2007 | Umeda | B60R 25/24 340/5.31 |
| 2008/0296032 A1* | 12/2008 | Masumoto | E02F 9/2004 172/321 |
| 2011/0303045 A1* | 12/2011 | Masumoto | G05G 1/06 74/504 |
| 2013/0213178 A1* | 8/2013 | Masumoto | G05G 1/04 74/523 |
| 2014/0345964 A1* | 11/2014 | Nakaoka | B60K 5/04 180/291 |
| 2016/0059912 A1 | 3/2016 | Fujimoto et al. | |
| 2017/0167112 A1* | 6/2017 | Nagai | E02F 9/2004 |
| 2018/0173233 A1* | 6/2018 | Matsuzaki | A01B 69/008 |
| 2018/0229601 A1* | 8/2018 | Komatsu | B60K 15/063 |

FOREIGN PATENT DOCUMENTS

| | | |
|---|---|---|
| JP | 2000203286 A | 7/2000 |
| JP | 2003291677 A | 10/2003 |
| JP | 2005186872 A | 7/2005 |
| JP | 200627571 A | 2/2006 |
| JP | 2011230639 A | 11/2011 |
| JP | 201251517 A | 3/2012 |
| JP | 201440143 A | 3/2014 |
| JP | 2014205368 A | 10/2014 |

\* cited by examiner

RIDING WORK VEHICLE

CROSS-REFERENCE TO RELATED APPLICATIONS

This application is the United States national phase of International Application No. PCT/JP2016/066770 filed Jun. 6, 2016, and claims priority to Japanese Patent Application Nos. 2015-192055 and 2015-192059, both filed Sep. 29, 2015, the disclosures of which are hereby incorporated in their entirety by reference.

TECHNICAL FIELD

This disclosure relates to a riding work vehicle.

BACKGROUND ART

Background Art 1

As one example of a riding work vehicle, there is known a tractor having, as a plurality of operational levers, an auxiliary speed changer lever, a PTO (power takeoff) speed changer lever and a PTO on/off lever (see Japanese Patent Literature 1 for example). In this tractor, each of the operational levers is disposed at a left side portion of a driver's seat on a vehicle body in such a manner that a grip portion of the PTO speed changer lever is juxtaposed with a grip portion of the PTO on/off lever in a front-rear direction adjacent the driver's seat. Further, the grip portion of the auxiliary speed changer lever is disposed on more vehicle-body lateral outer side than the grip portion of the PTO speed changer lever and the grip portion of the PTO on/off lever. In this tractor, in order to avoid the risk of a hand, gripping the grip portion of the auxiliary speed changer lever, coming into inadvertent contact with the PTO speed changer lever or the PTO on/off lever adjacent thereto during operation of the auxiliary speed changer lever, for instance, it is contemplated to increase the right-left spacing from the auxiliary speed lever to the PTO speed changer lever and the PTO on/off lever.

Background Art 2

Further, there is known a riding work vehicle including right and left fenders, each of the fenders having: a raised wall portion extending in the vertical direction; a first extension portion that extends under a forwardly downslope posture from an upper end portion of the raised wall portion to the vehicle body lateral outer side; a second extension portion that extends under a horizontal posture from the upper end portion of the raised wall portion to the vehicle body lateral outer side; and a third extension portion that extends under a rearwardly downslope posture from the upper end portion of the raised wall portion to the vehicle body lateral outer side. The riding work vehicle further includes: right and left first guard bodies, each of the first guard bodies extending under a front-rear oriented posture between an intermediate portion of the first extension portion and an front end portion of the second extension portion; and right and left second guard bodies, each of the second guard bodies having a "U"-letter shape in a plan view and extending between the front end portion and a rear end portion of the second extension portion (see e.g. Japanese Patent Literature 2). With the riding work vehicle, each second extension portion is used also as a "mount", each first guard body is used also as a "handgrip" for getting on/off the vehicle, and each second guard body is used also as a "guard member" for preventing fall of a mounted object from the second extension portion to the outside.

PRIOR ART DOCUMENTS

Patent Literatures

[Patent Literature 1]: JP 2011-230639 A (paragraphs 0015-0018, 0021, FIGS. 1-5)
[Patent Literature 2]: JP 2014-205368 A (paragraphs 0037-0038, FIG. 1).

SUMMARY OF THE INVENTION

Problem to be Solved by the Invention

Following is a [Problem 1] corresponding to [Background Art 1] as described above.

In order to increase the right-left spacing between operational levers disposed right and left in juxtaposition as described above, it is necessary to secure a large space in the right-left direction that is sufficient for the space for disposing each of the operational levers. To this end, when e.g. the disposing portion for the operational levers is located between the driver's seat and one of the right and left rear fenders, it is necessary to increase the spacing in the right-left direction between the driver's seat and said one of the right and left rear fenders. As a result, there is invited inconvenience of increase of the right-left width of the vehicle body, thus enlargement of the vehicle body.

Then, in the case of the tractor disclosed in Japanese Patent Literature 1, the grip portions of the operational levers are disposed upwardly of the left rear fender. This allows increase of the right-left spacing between the adjacent operational levers without enlarging the spacing between the driver's seat and said one of the right and left rear fenders in the right-left direction, so that the risk of a hand, gripping the grip portion of one of the right-left adjacent operational levers, coming into inadvertent contact with the other operational lever is avoided.

However, with the arrangement disclosed in Japanese Patent Literature 1, complicated bending arrangement of the respective operational levers are needed so that the base portions of the respective operational levers may be located between the driver's seat and the left rear fender, and that the grip portions of the respective operational levers may be located upwardly of the left rear fender. Thus, there remains room for improvement from the viewpoint of simplification of arrangement of the respective operational levers.

Namely, there remains a need for arranging a plurality of operational levers intensively for better operability between the driver's seat and one of the right and left rear fenders, without inviting complicated arrangement or enlargement of the vehicle body.

Following is a [Problem 2] corresponding to [Background Art 2] as described above.

In the arrangement disclosed in Japanese Patent Literature 2, each of the second guard body has a "U"-letter shape as seen in the plan view between the front end portion and the rear end portion of the second extension portion. So that, each rear fender does not allow mounting an object having a length greater than the front-rear length of the second extension portion. Thus, there remains room for improvement from the viewpoint of usability of each rear fender as a mount.

Moreover, since the first guard body is disposed under the right-left oriented posture for the driver, it is difficult for the driver to grip the first guard body when he/she gets on/off the vehicle via a getting on/off (access) portion which is disposed immediately forwardly of the rear fender. Thus, it is difficult to use the first guard boy as a handgrip for getting on/off. Thus, there remains room for improvement from the viewpoint of readiness of getting on/off the vehicle.

Namely, for the riding work vehicle as described above, there remain room for improvement in usability of each rear fender as a mount and also improvement in readiness of getting on/off the vehicle.

Solution to the Problem

A solution proposed for [Problem 1] as described above is as follows:

A riding work vehicle comprising:
a driver's seat;
right and left rear fenders disposed at positions on respective lateral sides of the driver's seat; and
a plurality of operational levers;
wherein the plurality of operational levers are disposed in right/left juxtaposition to each other between the driver's seat and one of the right and left rear fenders;
the plurality of operational levers include an inner operational lever that is disposed adjacent the driver's seat to be displaceable in a front-rear direction of a vehicle body; and
the plurality of operational levers include an outer operational lever that is disposed adjacent said one rear fender, the outer operational lever having an entire grip portion thereof disposed more upwardly of the vehicle body than a grip portion of the inner operational lever, the outer operational lever being displaceable in the front-rear direction of the vehicle body between a first operational position on more vehicle body front side than an operational range of the inner operational lever, and a second operational position on more vehicle body rear side than the operational range of the inner operational lever, the outer operational lever being position-retainable at the first operational position and the second operational position.

According to the above solution, when the inner operational lever is operated, the outer operational lever is located at either the first operational position or the second operational position which are distant in the vehicle body front-rear direction from the operational range of the inner operational lever. So that, the risk of a hand, gripping the grip portion of the inner operational lever, coming into inadvertent contact with the outer operational lever can be avoided without need to increase the right-left spacing between the inner operational lever and the outer operational lever.

Further, when the outer operational lever is operated, since the entire grip portion of this outer operational lever is disposed more upwardly of the vehicle body than a grip portion of the inner operational lever, the risk of a hand, gripping the grip portion of the outer operational lever, coming into inadvertent contact with the inner operational lever can be avoided without need to increase the right-left spacing between the inner operational lever and the outer operational lever.

Namely, even if the plurality of operational levers are disposed in right-left juxtaposition in the space having a narrow right-left width between the driver's seat and one of the right and left rear fenders, the risk of a hand, gripping the grip portion of one of operational levers, coming into inadvertent contact with the other operational lever can be avoided.

The above arrangement eliminates the need for increasing the right-left spacing between the operational levers disposed in right-left juxtaposition. As a result, there is no need to provide such measure as increasing the spacing in the right-left direction between the driver's seat and one of the right and left rear fenders or bending the respective operational levers in a complicated manner in the right-left direction.

Consequently, it has become possible to arrange a plurality of operational levers intensively for better operability between the driver's seat and one of the right and left rear fenders, without inviting complicated arrangement or enlargement of the vehicle body.

According to one preferred solution provided by the present invention:
each of the outer operational lever and the inner operational lever is configured to pivot in the vehicle body front-rear direction about a common support shaft oriented in the right-left direction; and
the outer operational lever has a length greater than the inner operational lever.

According to the above solution, the plurality of operational levers may be arranged with simpler arrangement, compared with another arrangement wherein the operational levers are formed as a front-rear slide type or a front-rear pivotal type having respective (dedicated) support shafts. Thus, only by forming the front-rear pivot type outer operational lever longer than the inner operational lever, it is possible to dispose the entire grip portion of the outer operational lever upwardly of the grip portion of the inner operational lever.

As a result, it is possible to arrange the plurality of operational levers intensively for better operability between the driver's seat and one of the right and left rear fenders, with achieving simplification of the arrangement at the same time.

According to one preferred solution proposed by the present invention:
the riding work vehicle further comprises:
a traveling speed changer device; and
a PTO clutch for selectively allowing or blocking power transmission to a PTO shaft that is configured to take off power for performing an implement work, wherein:
the inner operational lever comprises a speed changer lever that allows a speed changing operation of the speed changer device; and
the outer operational lever comprises a PTO clutch lever that allows a clutching/declutching operation of the PTO clutch.

According to the above solution, since the inner operational lever, that does not need to stride over the operational range of the other operational lever, is the speed changer lever, a speed changing operation of the speed changer device can be effected by a speedy lever operation with a short operational stroke.

The PTO clutch is provided with an urging device for urging the PTO clutch to return to its clutched (engaged) state. So that, at least a switchover operation from its clutched state to its declutched (disengaged) state tends to provide a heavy operational feel.

In view of the above, the PTO clutch lever has a greater length as described above. With this, an operational force required for switchover of the PTO clutch to the declutched state can be made lighter.

As a result, it becomes possible to improve the operability of the speed changer device and the PTO clutch by the respective operational levers.

According to one preferred solution proposed by the present invention:

the outer operational lever is configured such that a posture of the grip portion is set under a posture sloped toward the driver's seat, with an upper side of the grip portion being located more toward the driver's seat.

According to the above solution, at the time of an operation of the outer operational lever, it is possible to cause the grip portion of the outer operational lever to pass over the operational range of the inner operational lever. With this, even if the gap between the driver's seat and one of the right and left rear fenders is reduced, it is still possible to avoid the risk of a hand, tripping the grip portion of the outer operational lever disposed therebetween, from coming into contact with the rear fender.

As a result, it becomes possible to reduce the right-left width of the vehicle body without affecting operability of the outer operational lever, thus providing advantage from the viewpoint of e.g. transport of the riding work vehicle.

According to one preferred solution proposed by the present invention:

each of the rear fenders includes a mounting face at an upper end thereof; and the outer operational lever has an upper end thereof disposed lower than the mounting face relative to the vehicle body.

According to the above solution, in case the riding work vehicle is an agricultural work vehicle such as a tractor, for instance, the rear fenders can be conveniently utilized as mounts for placing other objects such as a bag holding therein an amount of fertilizer or agent to be consumed during the implement work. Notwithstanding or in addition to the above advantage, it is still possible to avoid risk of the outer operational lever or a hand, gripping the grip portion of this outer operational lever, coming into inadvertent contact with an object placed on the rear fender.

As a result, improvement of the work efficiency through convenient utilization of the rear fenders as mounts is made possible without deterioration in the operability of the outer operational lever.

A solution proposed for [Problem 2] as described above is as follows:

A riding work vehicle comprising:

a driving section having a driver's seat;

right and left rear fenders disposed at positions laterally of the driver's seat, each of the fenders having a top plate acting also as a mount; and right and left guard members for preventing fall of an object from the right and left top plates to the outside;

wherein each of the right and left top plates includes a horizontal flat face portion, a front side extension portion that extends forwardly downwards from a front end of the flat face portion, and a rear side extension portion that extends rearwardly downwards from a rear end of the flat face portion;

each of the right and left guard members includes a first leg portion on the front side that extends upwards from the front side extension portion, a second leg portion on the rear side that extends upwards from the rear side extension portion, and a guard portion having a U-shaped as seen in its plan view that extends between the first leg portion and the second leg portion; and a right-left oriented front end guard portion of the guard portion is disposed on more vehicle body front side than a front end of the flat face portion and a right-left oriented rear end guard portion of the guard portion is disposed on more vehicle body rear side than a rear end of the flat face portion.

According to the above solution, it is possible to place an object having a length longer than a front-rear length of the flat face portion of the top plate on this top plate. As a result, convenience of the top plate as a mount can be increased.

Also, when a driver gets on/off the vehicle from a getting on/off portion disposed immediately forwardly of the rear fender, the front end guard portion of the guard member is disposed under the front-rear oriented posture that allows easy gripping thereof by the driver getting on/off from the getting on/off portion, and comes closer to this getting on/off portion than the front end of the flat face portion, so that the front end guard portion can be utilized as a handgrip for getting on/off. As a result, ease of getting on/off the vehicle can be improved with simplified arrangement.

According to one preferred solution proposed by the present invention:

the first leg portion is connected continuously to an end portion of the front end guard portion on the driver's seat side.

According to the above solution, compared with e.g. another arrangement in which the first leg portion is connected continuously to a right-left intermediate portion of the front end guard portion, gripping of the front end guard portion is made easier. As a result, the front end guard portion can be used as a handgrip for getting on/off more easily.

EMBODIMENTS OF THE INVENTION

As an example of embodying the present invention, embodiments will be described with reference to the accompanying drawings, wherein the present invention is applied to a tractor as one example of a riding work vehicle.

First Embodiment

A first embodiment will be described hereinafter.

Figure 1:
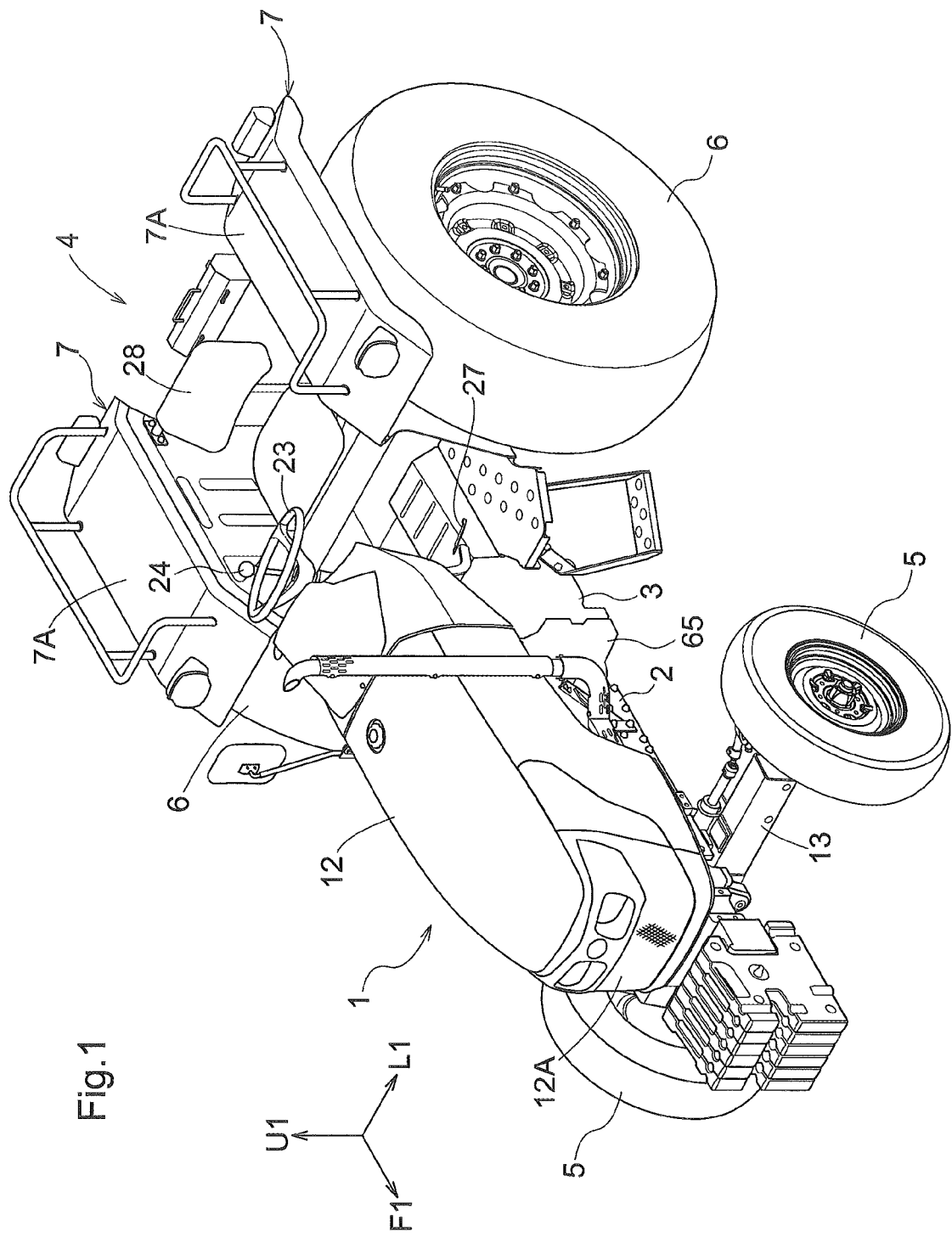
FIG. 1 shows a first embodiment and is a perspective view showing a tractor.

In the following description, a direction denoted with an arrow of a mark F1 in FIG. 1 is the front side of the tractor, a direction denoted with an arrow of a mark L1 is the left side of the tractor, and a direction denoted with an arrow of a mark U1 is the upper side of the tractor.

As shown in FIGS. 1-4, a tractor illustrated in this embodiment includes an engine section 1 disposed at a front half portion of the vehicle body, a front portion frame 2 supporting the engine section 1, a housing unit 3 acting also as a rear portion frame, a riding type driving section 4 disposed at a rear half portion of the vehicle body, right and left front wheels 5 disposed on the right and left sides of the engine section 1, right and left rear wheels 6 disposed on the right and left sides of the engine section 1, right and left rear fenders 7 covering the right and left rear wheels 6, and so on.

Figure 2:
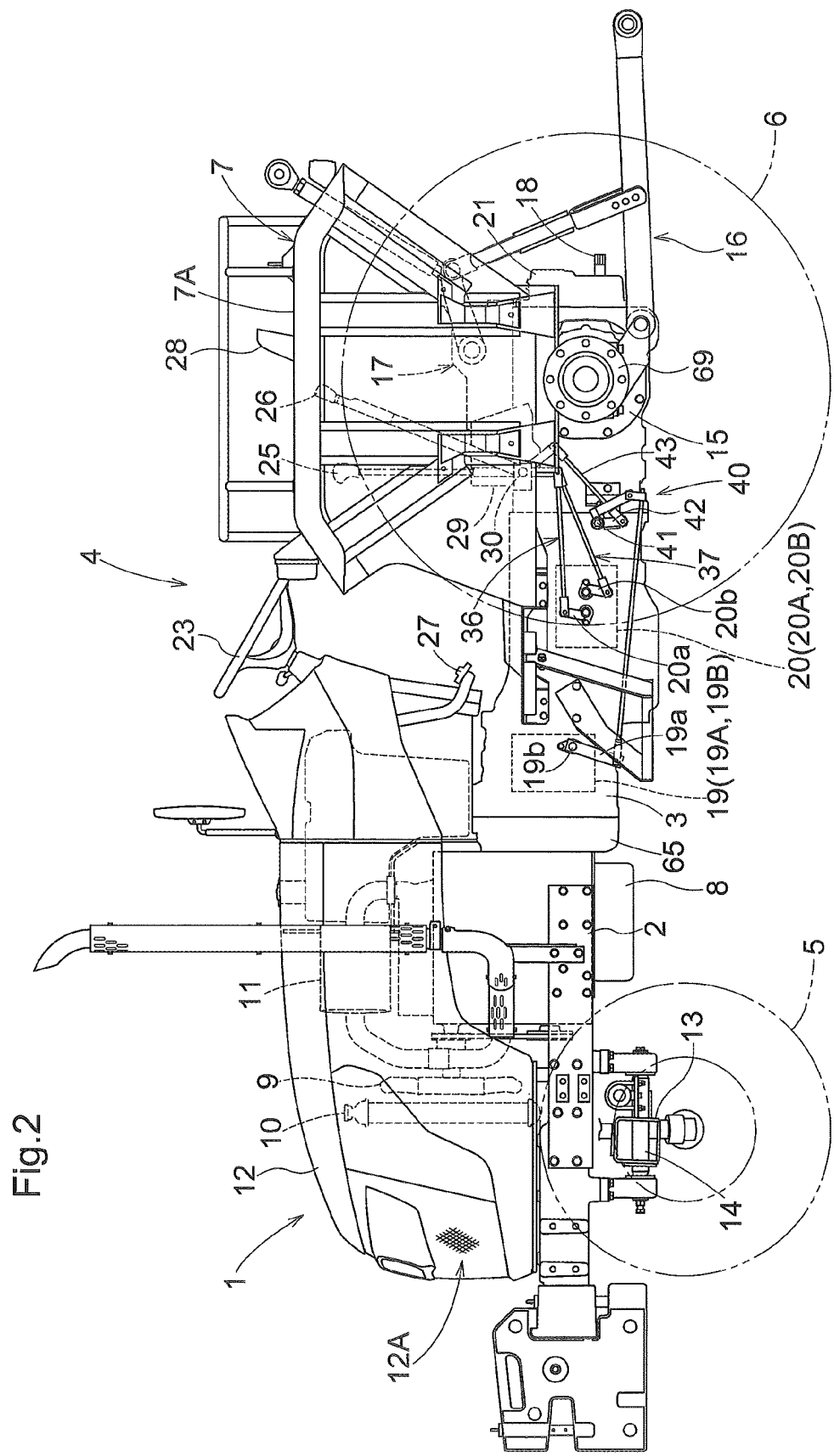
FIG. 2 shows the first embodiment and is a left side view showing the tractor.
Figure 3:
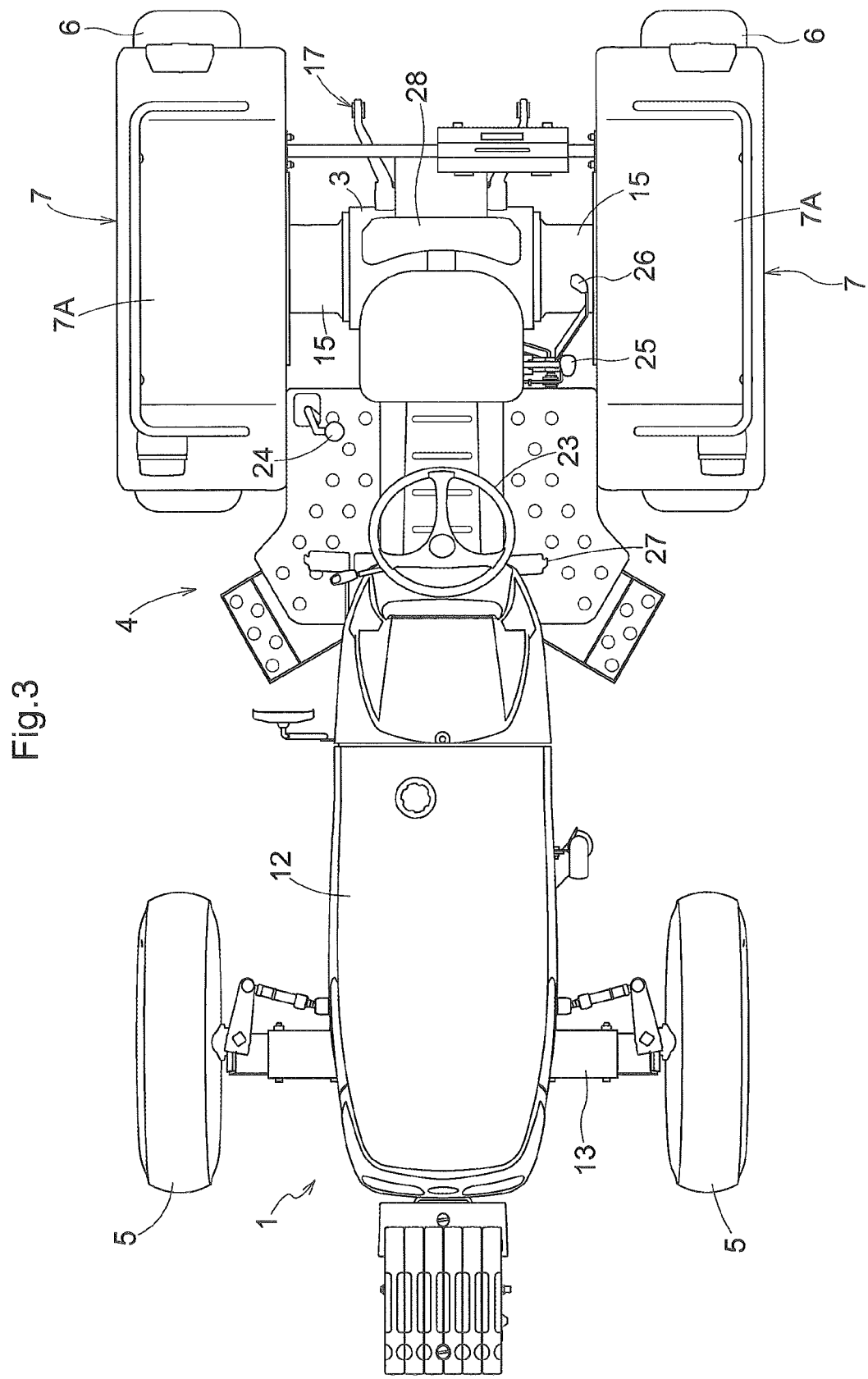
FIG. 3 shows the first embodiment and is a plan view showing the tractor.

As shown in FIGS. 1-3, the engine section 1 includes an engine 8 disposed at a rear portion of the engine section 1, a cooling fan 9 disposed forwardly of the engine 8, a radiator 10 disposed forwardly of the cooling fan 9, a muffler 11 disposed on the left side of the engine 8 to act as an exhaust gas treating device, a pivotally openable/closable hood 12 covering the above-mentioned members, etc. The cooling fan 9, when operated, introduces ambient air into the hood via an intake portion 12A provided at a front end of the hood 12, and feeds the introduced ambient air as cooling air to the radiator 10, the engine 8 disposed rearwardly.

The front portion frame 2 supports a right-left oriented front wheel support member 13 that supports right and left front wheels 5 with allowing rolling thereof via front-rear oriented support shafts 14, etc.

Figure 4:
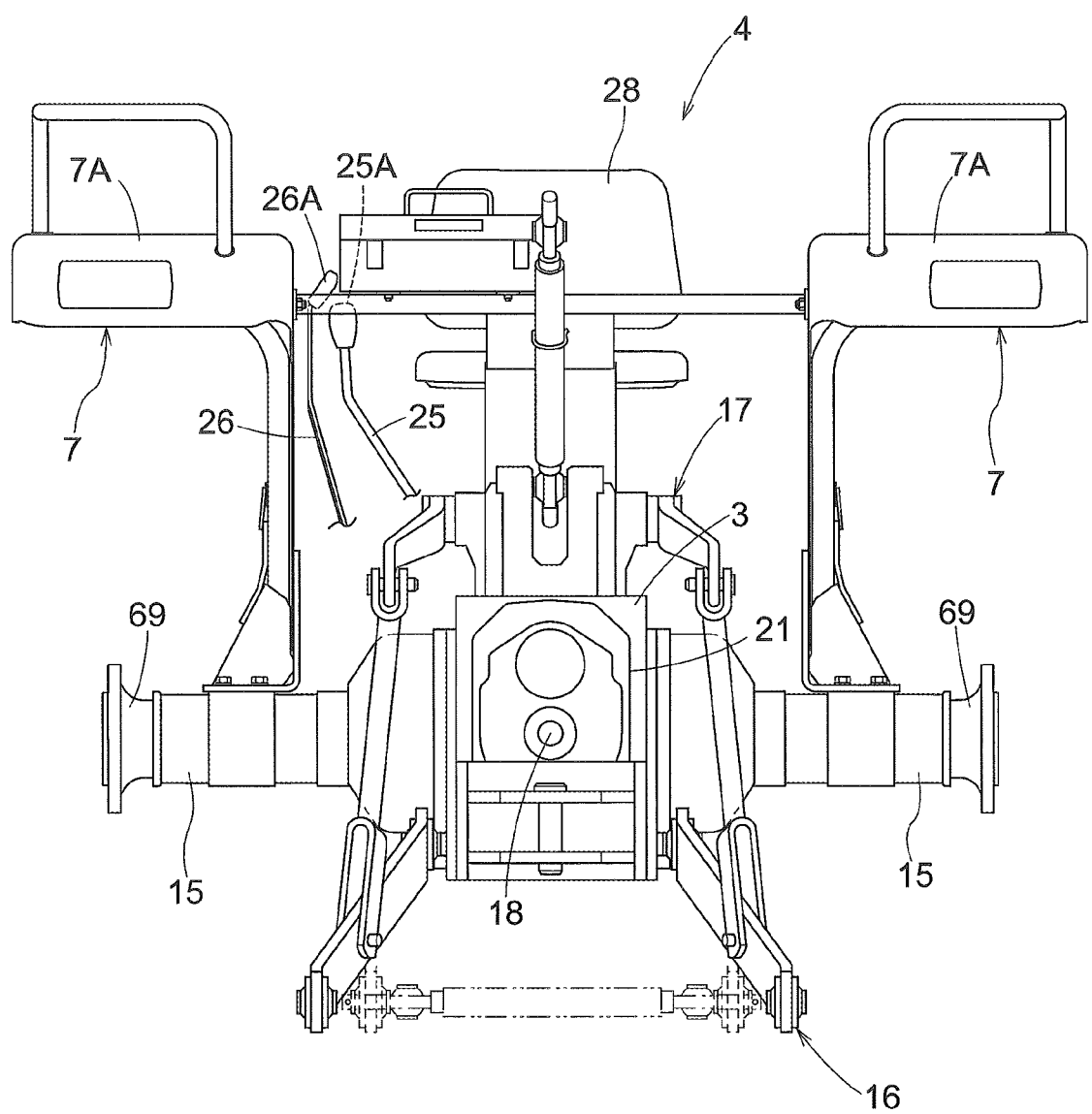
FIG. 4 shows the first embodiment and is a rear view showing principal portions of the tractor.
Figure 5:
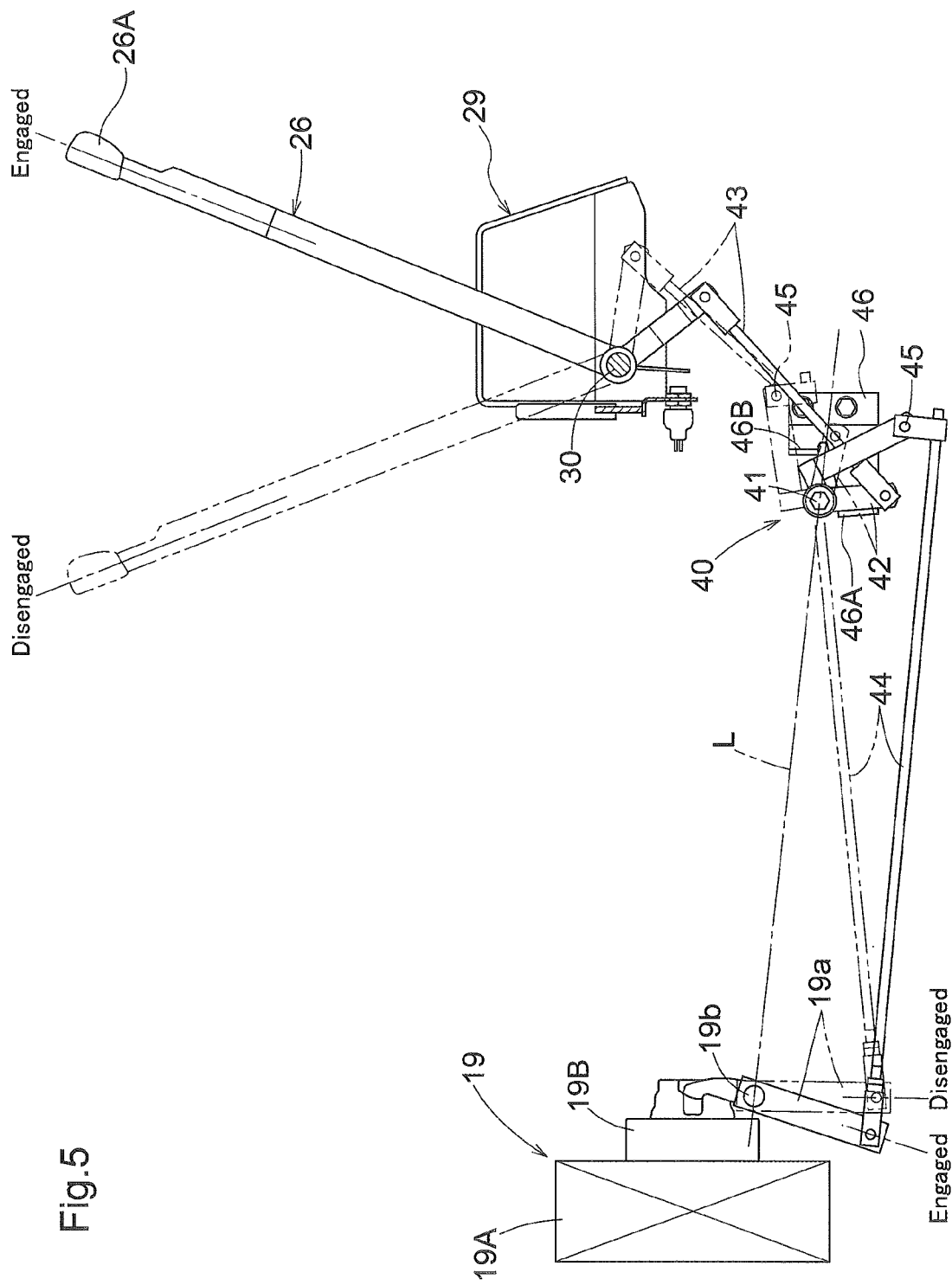
FIG. 5 shows the first embodiment and is a left side view of principal portions showing an operational arrangement of a PTO (power takeoff) clutch.
Figure 6:
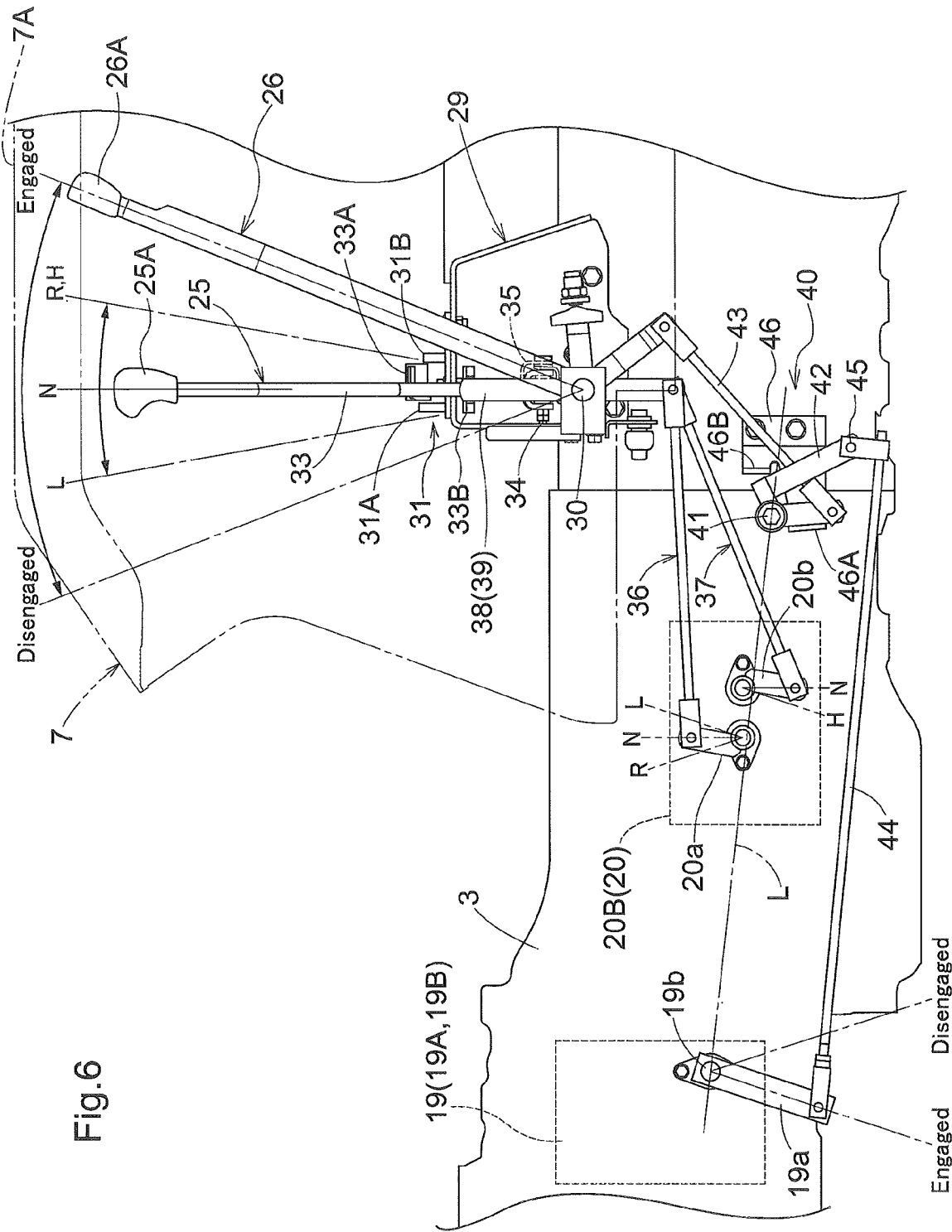
FIG. 6 shows the first embodiment and is a left side view of principal portions showing respective operational arrangements of an auxiliary speed changing section and the PTO clutch.
Figure 7:
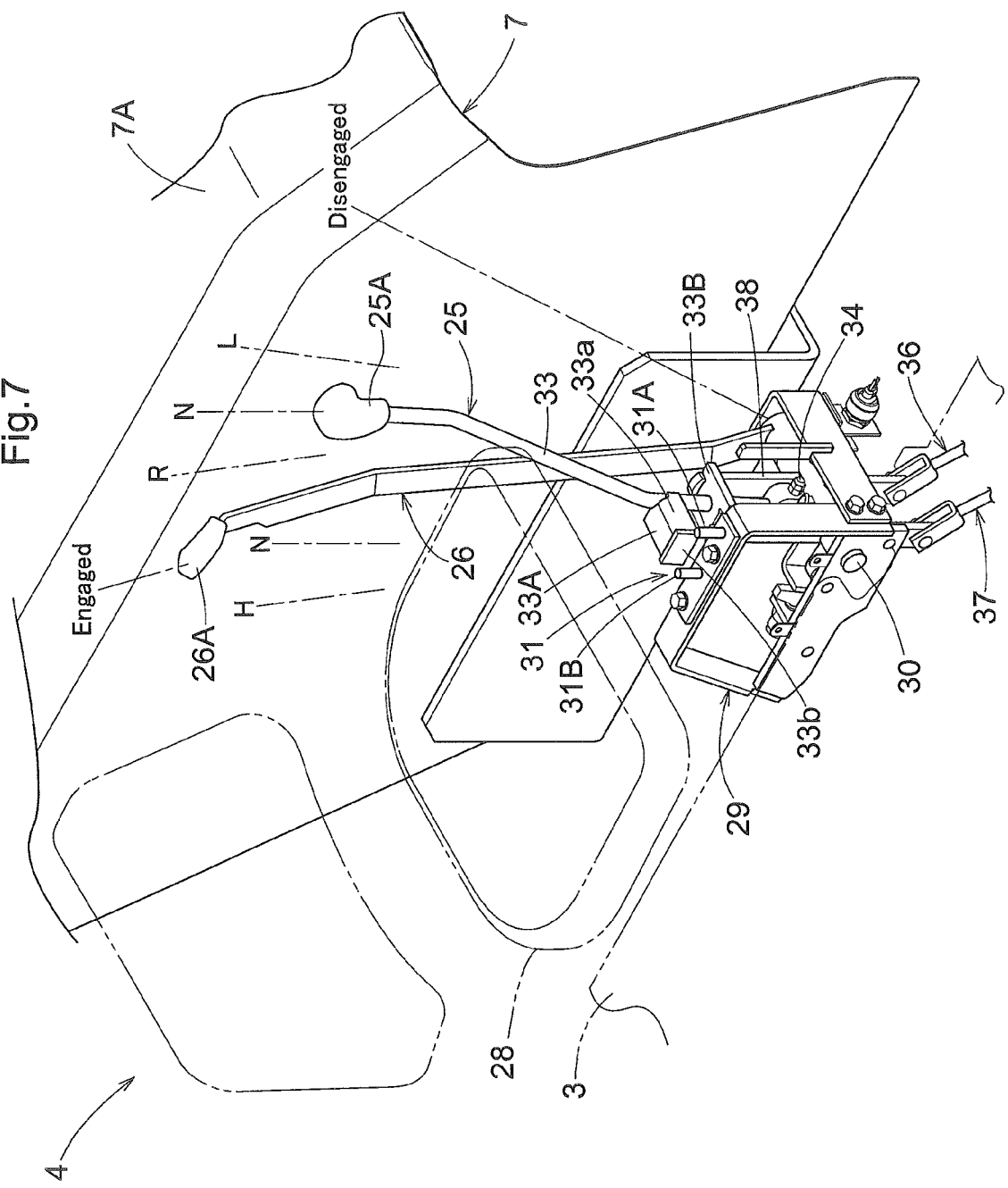
FIG. 7 shows the first embodiment and is a perspective view of principal portions showing layouts and arrangements, etc. of the auxiliary speed changer lever and a PTO clutch lever.
Figure 8:
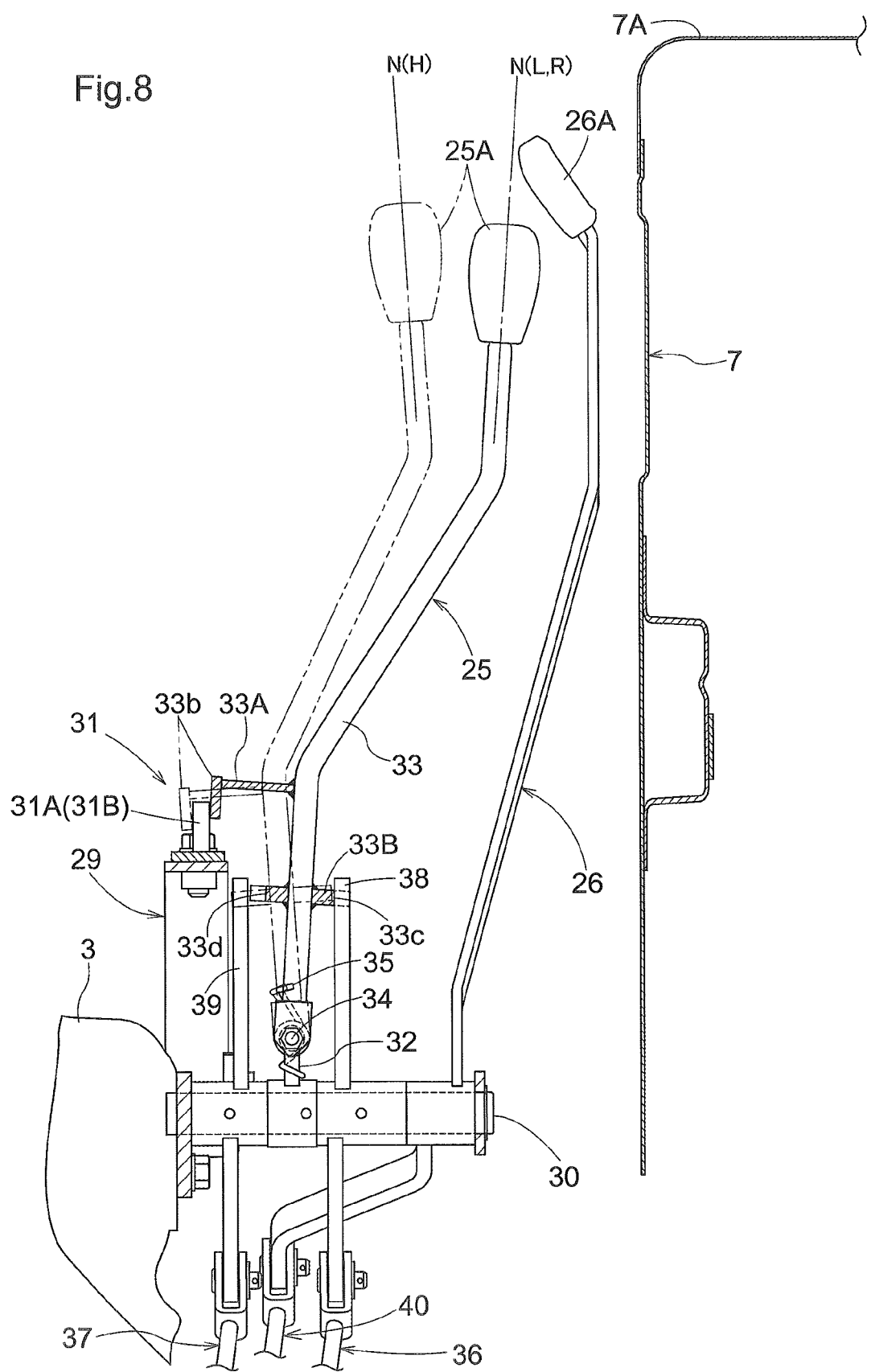
FIG. 8 shows the first embodiment and is a front view in vertical section of principal portions showing layouts and arrangements, etc. of the auxiliary speed changer lever and the PTO clutch lever.
Figure 9:
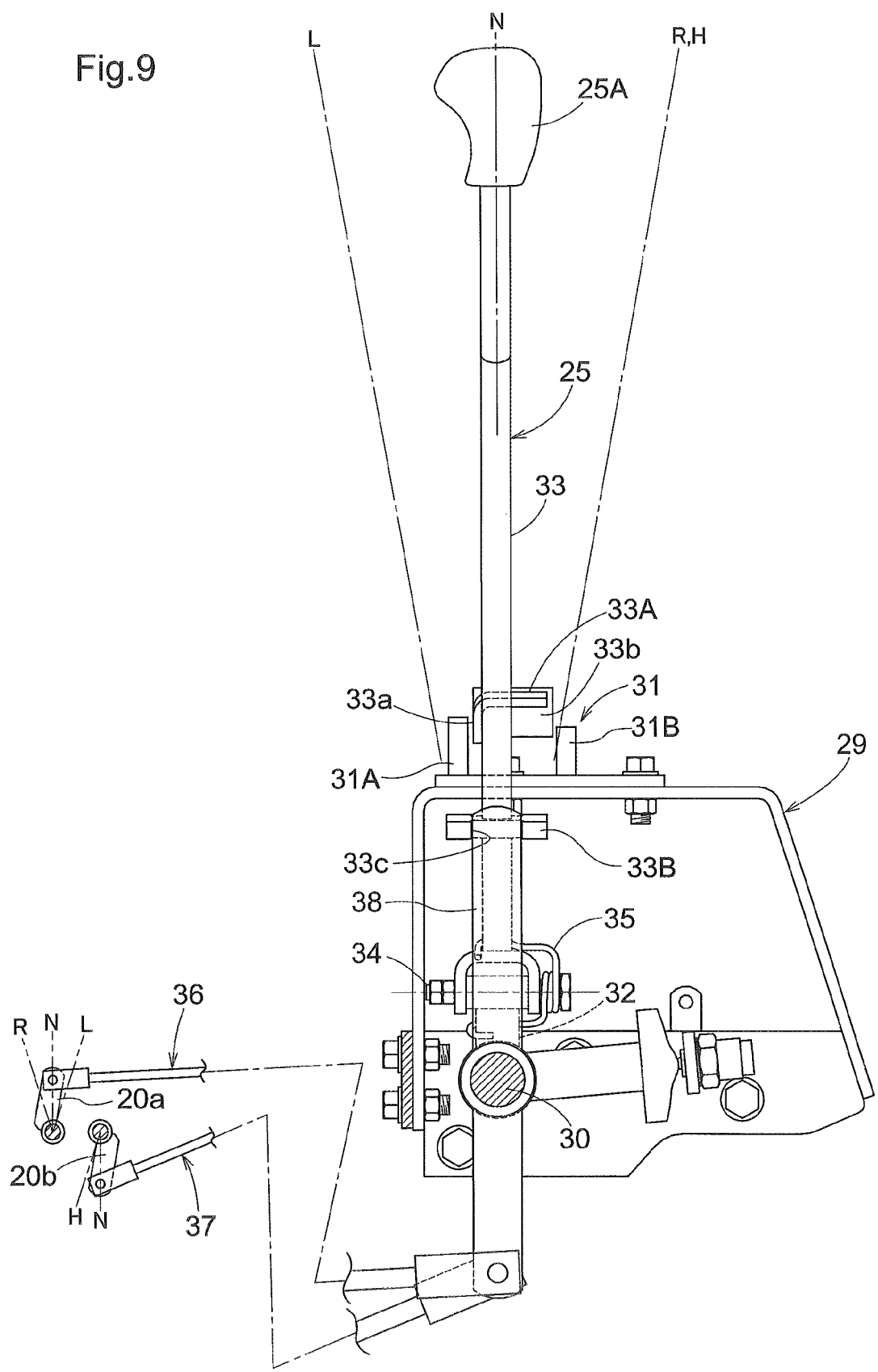
FIG. 9 shows the first embodiment and is a left side view in vertical section of principal portions showing the auxiliary speed changer lever located at a neutral position.
Figure 10:
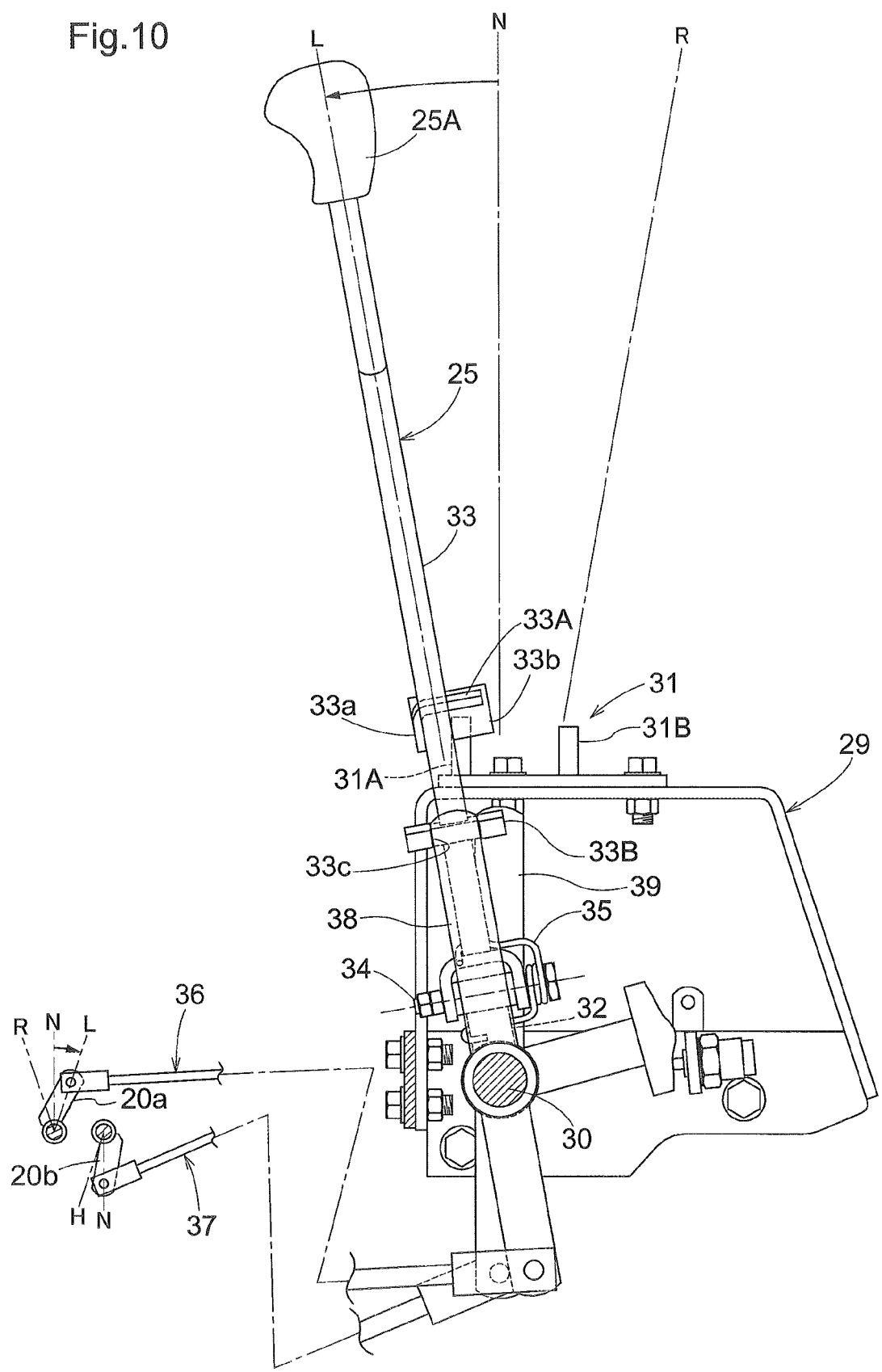
FIG. 10 shows the first embodiment and is a left side view in vertical section of principal portions showing the auxiliary speed changer lever located at a forward low speed position.
Figure 11:
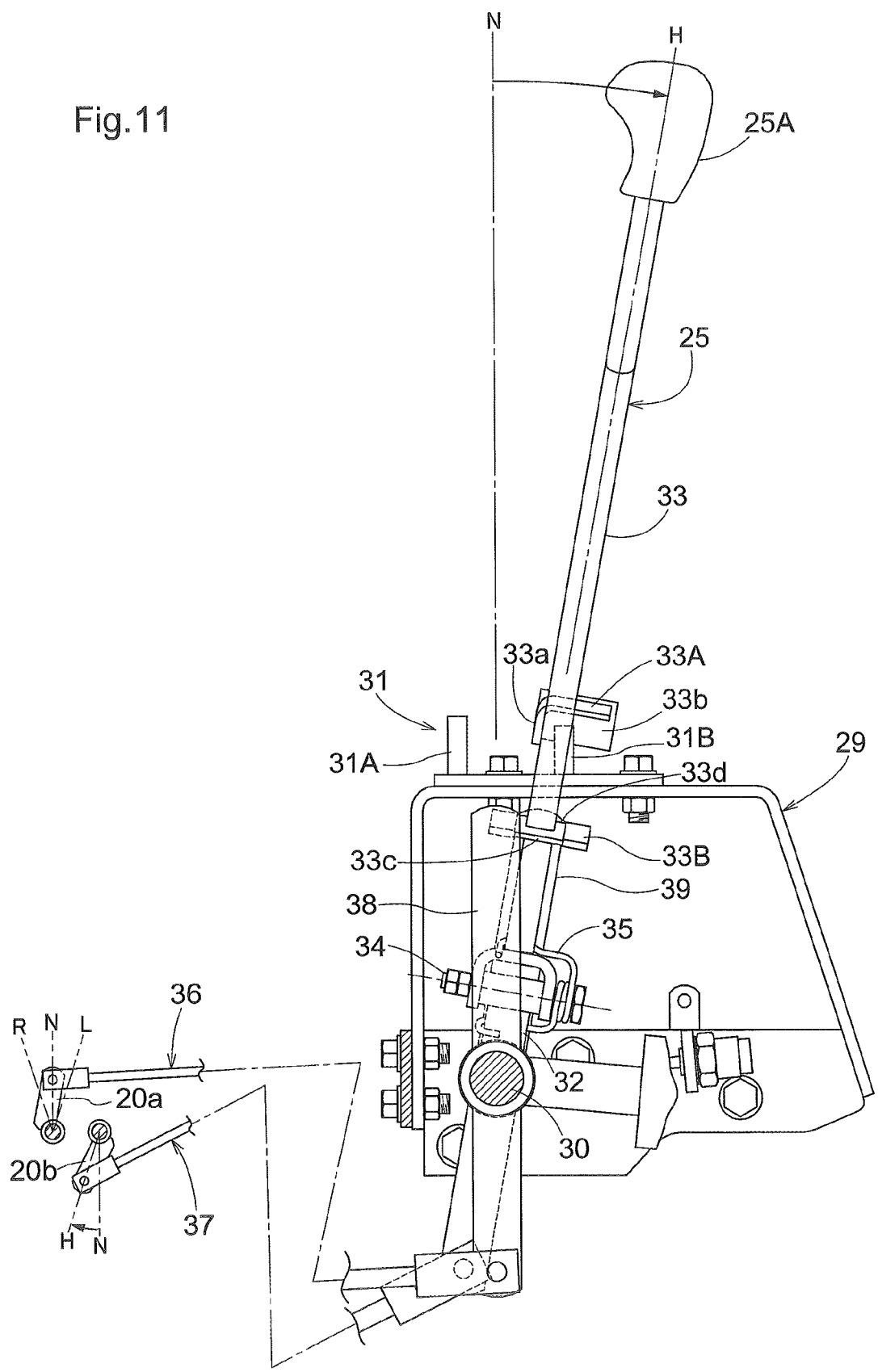
FIG. 11 shows the first embodiment and is a left side view in vertical section of principal portions showing the auxiliary speed changer lever located at a forward high speed position.
Figure 12:
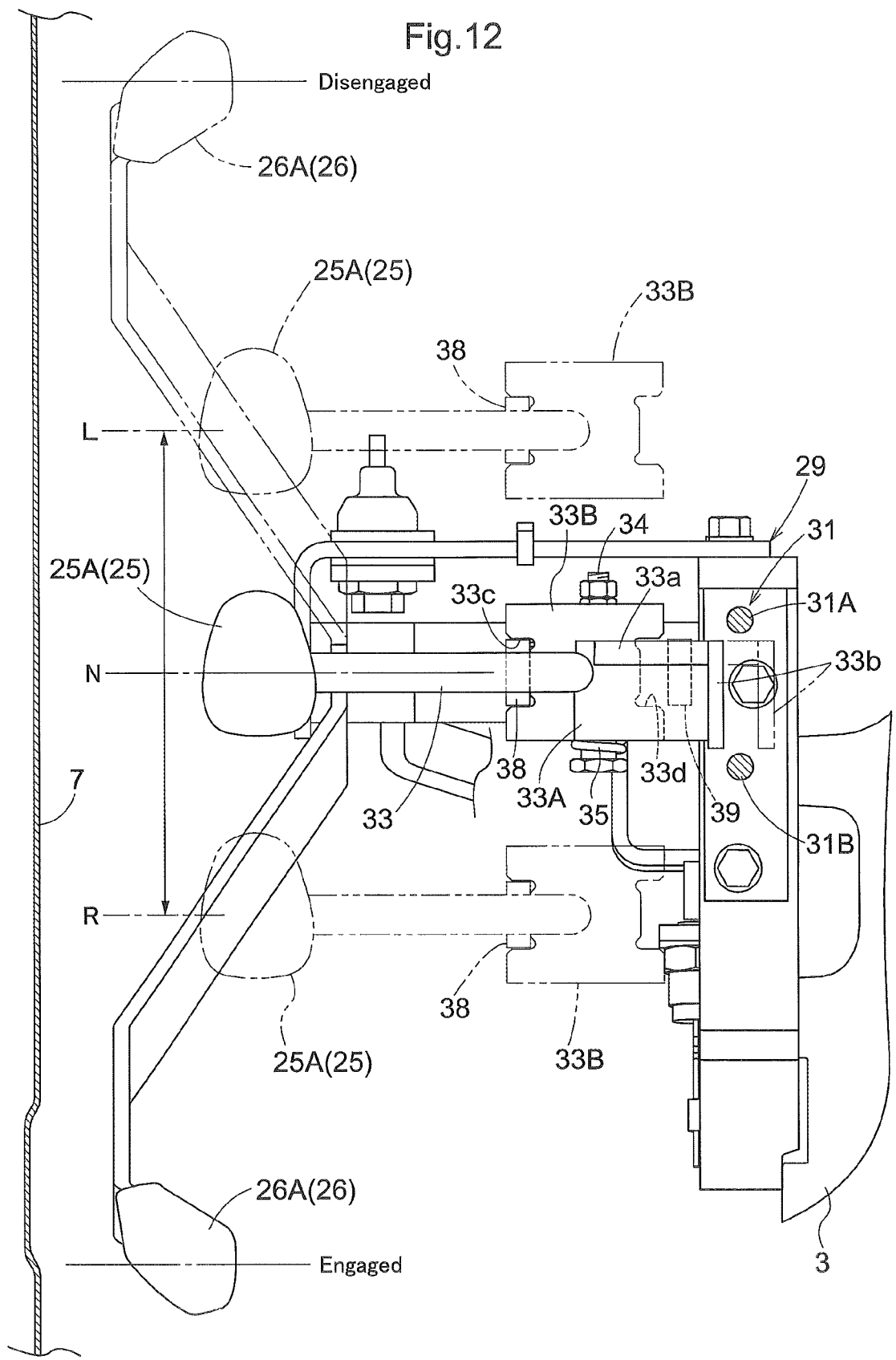
FIG. 12 shows the first embodiment and is a plan view in section of principal portions showing e.g. positional relationships among the neutral position, the forward low speed position and the forward high speed position; and an engaged position and a disengaged position of the PTO clutch lever, etc.
Figure 13:
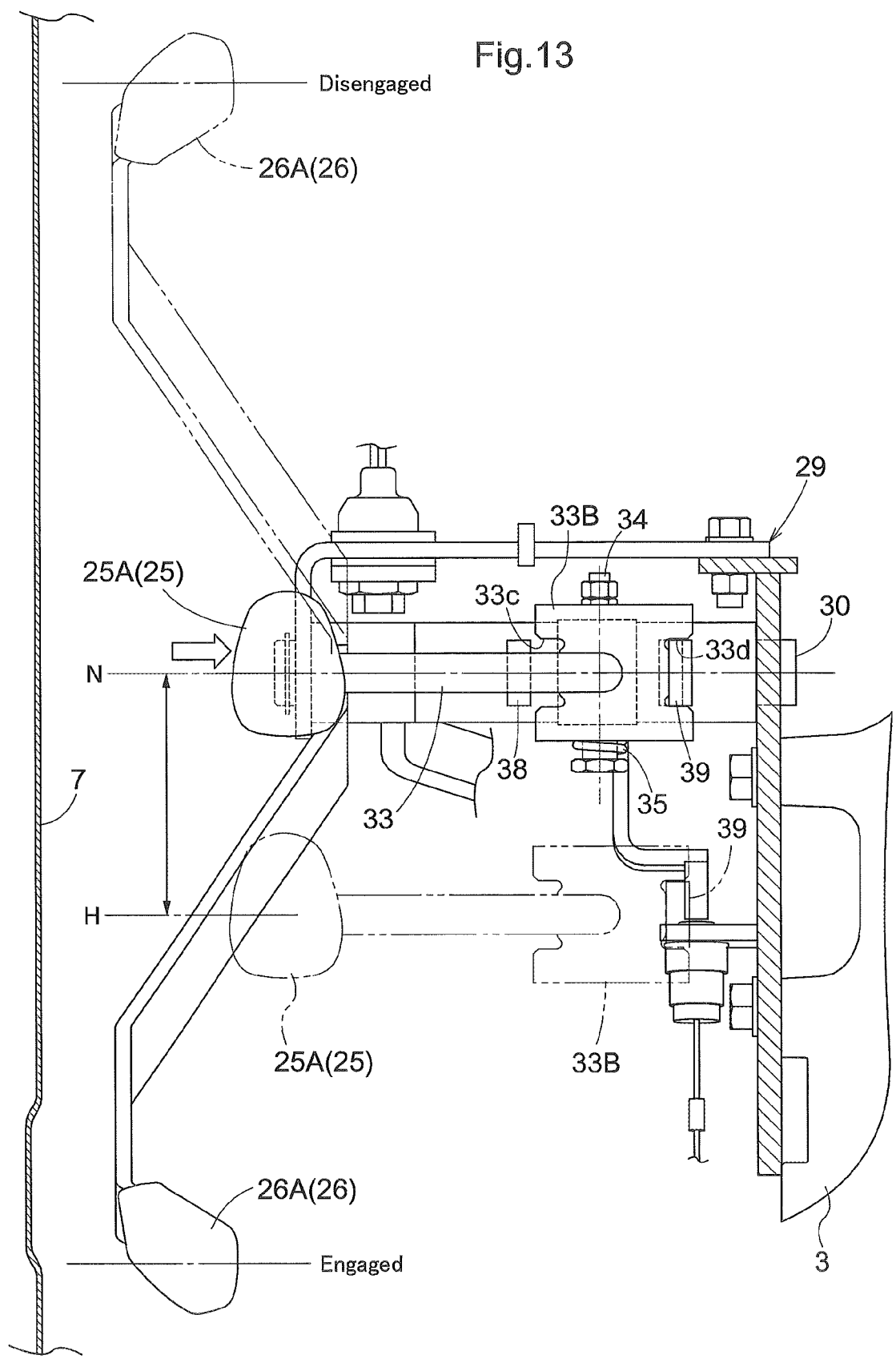
FIG. 13 shows the first embodiment and is a plan view in vertical section showing e.g. the positional relationships among the neutral position, the forward low speed position and the forward high speed position; and the engaged position and the disengaged position of the PTO clutch lever, etc.
Figure 14:
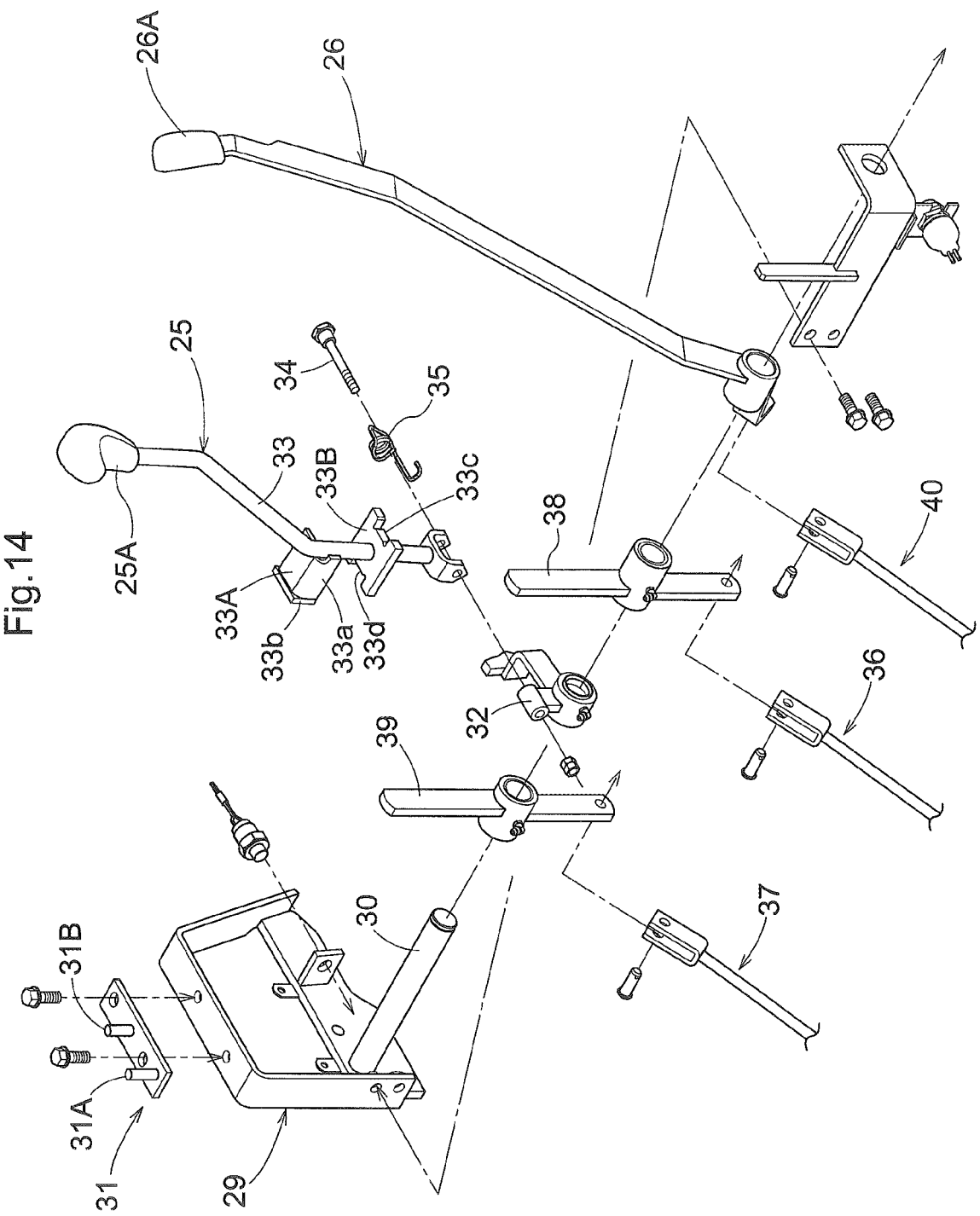
FIG. 14 shows the first embodiment and is an exploded perspective view of principal portions showing arrangements of the auxiliary speed changer lever and the PTO clutch lever.

As shown in FIGS. 2-4, the housing unit 3 includes, at a rear portion thereof, right and left rear axle cases 15 extending to the right and left sides, an implement-coupling link mechanism 16, an elevation/lowering unit 17 of electronic hydraulic control type for elevating/lowering an implement (not shown) via the link mechanism 16, a PTO (power takeoff) shaft 18 that allows takeoff of work power for the implement, etc.

As shown in FIG. 2 and FIGS. 4-6, the housing unit 3 includes, therein, a dual clutch 19 of independent type that allows/blocks power transmission from the engine 8, a speed changer device 2 configured to speed-change traveling power via the dual clutch 19, a rear wheel differential device (not shown), a PTO speed changer device 21 configured to speed-change the implement power transmitted to the PTO shaft 18 via the dual clutch 19.

The dual clutch 19 includes a traveling clutch 19A for allowing/blocking transmission of traveling power, and a PTO clutch 19B for allowing/blocking transmission of implement power to the PTO shaft 18. The speed changer device 20 includes a gear type main speed changing section 20A, a gear type auxiliary speed changing section 20B, etc. The main speed changing section 20A speed-changes the traveling power in four speeds. The auxiliary speed changing section 20B switches over the traveling power between power for forward traveling and power for reverse traveling, and also speed-changes the forward traveling power between two, high and low, speeds. The PTO speed changer device 21 is a gear type and speed-changes the implement driving power in two, high and low, speeds.

As shown in FIGS. 1 through 4, the driving section 4 includes a steering wheel 23 for steering the front wheels, a main speed changer lever 24 to act as an operational lever for the main speed changing section, an auxiliary speed changer lever 25 to act as an operational lever for the auxiliary speed changing section, a differential lock lever (not shown) to act as an operational lever for the differential device, a height setting lever (not shown) to act as an operational lever of an elevating/lowering unit, a PTO clutch lever 26 to act as an operational lever for the PTO speed changer device, a clutch pedal 27 for a traveling clutch, a driver's seat 28 disposed between right and left rear fenders 7, and so on.

The main speed changer lever 24 is disposed between the driver's seat 28 and the right rear fender 7. The auxiliary speed changer lever 25 and the PTO clutch lever 26 are disposed in right/left juxtaposition to each other between the driver's seat 28 and the left rear fender 7.

As show in FIGS. 5 through 14, the housing unit 3 includes a support frame 29 at a left side portion of its front-rear intermediate portion. The support frame 29 includes a right-left oriented first support shaft 30 and a lever guide 31 for the auxiliary speed changer lever. The first support shaft 30 supports the auxiliary speed changer lever 25 and the PTO clutch lever 26 pivotally in the vehicle body front-rear direction, in such a manner that the auxiliary speed changer lever 25 constitutes an inner operational lever disposed on the side of the driver's seat and the PTO clutch lever 26 constitutes an outer operational lever on the side of the rear fender.

As shown in FIGS. 6 through 14, the auxiliary speed changer lever 25 includes a first member 32 on the base end side, and a second member 33 on the free end side thereof. The first member 32 is fitted on the first support shaft 30 to be pivotable to the front and rear sides. The second member 33 is pivotable in the right-left direction relative to the first member 32 about a front-rear oriented second support shaft 34.

With the above arrangement, the auxiliary speed changer lever 25 is pivotally operable to respective operational positions including a neutral position, a forward low speed position located on the left front side of the neutral position, a forward high speed position located on the right rear side of the neutral position, and a reverse position located on the left rear side of the neutral position.

As shown in FIGS. 6-12 and FIG. 14, the second member 33 of the auxiliary speed changer lever 25 includes a guided portion 33A at its base end side end portion. This guided portion 33A has a vertically reversed "L"-letter shape as seen in its left side view with a front wall 33a, and further includes a lateral wall 33b at its right end portion.

The lever guide 31 includes front and rear guide pins 31A, 31B extending upwards. The front and rear guide pins 31A, 31B have a front-rear spacing therebetween that allows entrance of the guided portion 33A of the auxiliary speed changer lever 25. The portion between the front and rear guide pins 31A is set to the neutral position of the auxiliary speed changer lever 25. As the front guide pin 31A comes into contact with the lateral wall 33b of the guided portion 33A, the front guide pin 31A prevents a pivotal movement of the auxiliary speed changer lever 25 from the forward low speed position to the right side. As the front guide pin 31A comes into contact with the front wall 33a of the guided portion 33A, the front guide pin 31A prevents a pivotal movement of the auxiliary speed changer lever 25 from the neutral position to the right front side. As the rear guide pin 31B comes into contact with the lateral wall 33b of the guided portion 33A, the rear guide pin 31B prevents a right-left pivotal movement of the auxiliary speed changer lever 25 between the forward high speed position and the reverse position of the auxiliary speed changer lever 25.

Namely, with the above simple arrangement that the auxiliary speed changer lever 25 is provided with the guided portion 33A and the support frame is provided with the front and rear guide pins 31A, 31B for restricting movements of the guided portion 33A, it is possible to obtain a lever guide configuration that sets an operational path of the auxiliary speed changer lever 25 to an "h"-letter shaped path such that pivotal operations of the auxiliary speed changer lever 25 among the forward low speed position, the forward high speed and the reverse position may always occur via the neutral position.

And, in setting the operational path of the auxiliary speed changer lever 25 to such an "h"-letter shaped path, there is no need to provide and assemble a lever guide having an "h"-letter shaped guide groove, and thus there is no need to insert the auxiliary speed changer lever 25 into the guide groove, either, whereby assembly of the auxiliary speed changer lever 25 can be facilitated.

As shown in FIGS. 8-14, the second member 33 of the auxiliary speed changer lever 25 is pivotally urged toward the left side by a torsion spring 35. This arrangement facilitates a pivotal operation between the neutral position and the forward low speed position of the auxiliary speed changer lever 25 which is often used during a work traveling, as well as a pivotal operation of the auxiliary speed changer lever 25 between the neutral position and the reverse position.

As shown in FIGS. 6-14, the auxiliary speed changing section 20B includes a first operational arm 20a that allows switchover among a neutral state, a forward low speed state and a forward high speed state; and a second operational arm 20b that allows switchover between the neutral state and the forward high speed state. The first operational arm 20a can be linked with the second member 33 of the auxiliary speed changer lever 25 via a first link mechanism 36 for auxiliary speed change. The second operational arm 20b can be linked with the second member 33 of the auxiliary speed changer lever 25 via a second link mechanism 37 for auxiliary speed change. The second member 33 of the auxiliary speed changer lever 25 includes a linking portion 33B upwardly of the guided portion 33A. The linking portion 33B is formed in an "H"-letter shape having recessed portions 33c, 33d on the right and left opposed ends thereof. The first link mechanism 36 includes a first arm 38 which enters the left recessed portion 33c of the linking portion 33B. The second link mechanism 37 includes a second arm 39 that enters the right recessed portion 33d of the linking portion 33B. The first arm 38 is supported to the left end portion of the first support shaft 30 to be pivotable in the front-rear direction. The second arm 39 is supported to the right end portion of the first support shaft 30 to be pivotable in the front-rear direction.

With the above arrangement, if the auxiliary speed changer lever 25 is located at the neutral position and if the second member 33 is pivotally operated to the left side, the first arm 38 enters the left recessed portion 33c of the linking portion 33B. With this, the auxiliary speed changer lever 25 is operably linked to the first operational arm 20a via the first link mechanism 36. As a result, switching operations of the auxiliary speed changing section 20B among the neutral state, the forward low speed state and the reverse state become possible.

Conversely, if the auxiliary speed changer lever 25 is located at the neutral position and if the second member 33 is pivotally operated to the right side, the second arm 39 enters the right recessed portion 33d of the linking portion 33B. With this, the auxiliary speed changer lever 25 is operably linked to the second operational arm 20b via the second link mechanism 37. As a result, switching operations of the auxiliary speed changing section 20B between the neutral state and the forward high speed state become possible.

As shown in FIGS. 5-8 and FIGS. 12-14, the PTO clutch lever 26 is linked with an operational arm 19a of the PTO clutch 19B via a linking mechanism 40 for PTO clutch. The PTO clutch 19B incorporates an urging device (not shown) for urging the PTO clutch 19B to return to the clutched (engaged) state. The linking mechanism 40 includes a relay arm 42 which pivots about a right-left oriented relay shaft 41, a first rod 43 extending between the PTO clutch lever 26 and the relay arm 42, a second rod 44 extending between the operational arm 19a and the relay arm 42, and so on. The linking mechanism 40 is configured such that when the PTO clutch lever 26 is operated to its engaged position, the PTO clutch 19B is switched to the clutched state and also a pin 45 which connects the relay arm 42 with the second rod 44 may be located downwardly of a virtual line L which connects the support shaft 19b of the operational arm 19a to the relay shaft 41. The linking mechanism 40 is configured also such that when the PTO clutch lever 26 is operated to its disengaged position, the PTO clutch 19B is switched to the declutched (disengaged) state and also the pin 45 may be located upwardly of the virtual line L. The relay shaft 41 is provided at the left end portion of the housing unit 3 together with a receiving member 46. The receiving member 46 includes a first receiving portion 46A which receives the relay arm 42 in association with arrival of the PTO clutch lever 26 at its engaged position, and a second receiving portion 46B which receives the relay arm 42 in association with arrival of the PTO clutch lever 26 at its disengaged position.

With the above arrangement, when the PTO clutch lever 26 is operated to the engaged position, due to the functions of the urging device in the PTO clutch and the receiving member 46, the PTO clutch 19B can be retained under its clutched state and also the PTO clutch lever 26 can be retained at the engaged position. Conversely, when the PTO clutch lever 26 is operated to the disengaged position, due to the functions of the urging device in the PTO clutch and the receiving member 46, the PTO clutch 19B can be retained under its declutched state and also the PTO clutch lever 26 can be retained at the disengaged position.

As shown in FIGS. 6-8 and FIG. 12 and FIG. 13, the PTO clutch lever 26 is configured to be displaceable in the vehicle body front-rear direction among a disengaged position (first operational position) on more vehicle body front side than an operational range of the auxiliary speed changer lever 25, and an engaged position (second operational position) on more vehicle body rear side than the operational range of the auxiliary speed changer lever 25; and the PTO clutch lever 26 is position-retainable at the engaged position and the disengaged positions, with the entire grip portion 26A thereof being located more upwardly of the vehicle body than the grip portion 25A of the auxiliary speed changer lever 25.

With the above arrangement, when the auxiliary speed changer lever 25 is operated, since the PTO clutch lever 26 is located at the disengaged position or the engaged position which are distant in the vehicle body front-rear direction from the operational range of the auxiliary speed changer lever 25, it is possible to avoid a hand, which is gripping the grip portion 25A of the auxiliary speed changer lever 25, from running the risk of coming into inadvertent contact with the PTO clutch lever 26, without enlarging the right-left spacing between the auxiliary speed changer lever 25 and the PTO clutch lever 26.

Further, when the PTO clutch lever 26 is operated, since the entire grip portion 26A of this PTO clutch lever 26 is located upward of the gripping portion 25A of the auxiliary speed changer lever 25, it is possible to avoid a hand, which is gripping the grip portion 26A of the PTO clutch lever 26, from running the risk of coming into inadvertent contact with the auxiliary speed changer lever 25, without enlarging the right-left spacing between the auxiliary speed changer lever 25 and the PTO clutch lever 26.

Namely, even if the auxiliary speed changer lever 25 and the PTO clutch lever 26 are disposed in right/left juxtaposition to each other within the right-left narrow width space between the driver's seat 28 and the left rear fender 7, the risk of a hand gripping the grip portion 25A, 26A of one lever 25, 26 coming into inadvertent contact with the other lever 25, 26 can be effectively avoided.

Thus, there is no need to increase the right-left spacing between the auxiliary speed changer lever 25 and the PTO clutch lever 26 which are disposed in right/left juxtaposition to each other. Consequently, it becomes possible to eliminate taking of such measure as to increase the spacing between the driver's seat 28 and the left rear fender 7 or to bend the auxiliary speed changer lever 25 and the PTO clutch lever 26 in a complicated manner in the right-left direction, in order to increase the right-left spacing.

As a result, the auxiliary speed changer lever 25 and the PTO clutch lever 26 can be disposed between the driver's seat 28 and the left rear fender 7 intensively for their better operability, without inviting complications of their arrangements or enlargement of the vehicle body.

As shown in FIGS. 6-8 and FIGS. 12-14, the auxiliary speed changer lever 25 and the PTO clutch lever 26 are pivotable in the vehicle body front-rear direction about the common (shared) support shaft 30. And, the PTO clutch lever 26 disposed on the vehicle body outer side is formed longer than the auxiliary speed changer lever 25 disposed on the vehicle body inner side.

With the above arrangement, compared with another arrangement wherein the auxiliary speed changer lever 25 and the PTO clutch lever 26 are formed as front-rear slide type or front-rear pivotal type having respective support shafts, only by forming the PTO clutch lever 26 longer than the auxiliary speed changer lever 25, it is possible to dispose the entire grip portion 26A upwardly of the grip portion 25A of the auxiliary speed changer lever 25.

As a result, together with realization of simplifications of the arrangements, the auxiliary speed changer lever 25 and the PTO clutch lever 26 can be disposed between the driver's seat 28 and the left rear fender 7 intensively for their better operability.

As described above, of the two operational levers disposed between the driver's seat 28 and the left rear fender 7, the inner operational lever is the auxiliary speed changer lever 25 and the outer operational lever is the PTO clutch lever 26.

Namely, since the inner operational lever that does not need to stride over the operational range of the PTO clutch lever 26 is the auxiliary speed changer lever 25, a speed changing operation of the auxiliary speed changing section 20B can be effected by a speedy lever operation with a short operational stroke.

Further, as described above, the tractor utilizes the urging device incorporated in the PTO clutch to enable retention of the PTO clutch 19B under both the declutched state and the clutched state, as well as retention of the PTO clutch lever 26 at both the disengaged position and the engaged position. Whereby, the switchover operation between the clutched state and the declutched state of the PTO clutch 19B by the PTO clutch lever 26 tends to provide a heavy operational feel.

Then, in view of the above, the PTO clutch lever 26 has a greater length so as to lighten an operational force thereof that is required for switchover of the PTO clutch 19B between the clutched state and the declutched state of the PTO clutch 19B by the PTO clutch lever 26.

As a result, it becomes possible to improve the operability of the auxiliary speed changing section 20B by the auxiliary speed changer lever 25 and the operability of the PTO clutch 19B by the PTO clutch lever 26.

As shown in FIG. 3, FIG. 4, FIG. 7, FIG. 8 and FIGS. 12-14, the PTO clutch lever 26 is set under a posture sloped toward the driver's seat, with the upper side of its grip portion 26A being disposed on more driver's seat side.

With the above arrangement, at the time of an operation of the PTO clutch lever 26, it is possible to cause the grip portion 26A of the PTO clutch lever 26 to pass over the operational range of the auxiliary speed changer lever 25. With this, even if the gap between the driver's seat 28 and the left rear fender 7 is reduced, it is still possible to avoid a hand, gripping the grip portion 26A of the PTO clutch lever 26 disposed therebetween, from running the risk of coming into contact with the rear fender 7.

As a result, it becomes possible to reduce the right-left width of the vehicle body without affecting the operability of the PTO clutch lever 26, thus providing advantage from the viewpoint of e.g. transport of this tractor.

As shown in FIGS. 1-4 and FIGS. 6-8, the right and left rear fenders 7 respectively include a mounting face 7A on a top portion each thereof. The PTO clutch lever 26 has its upper end disposed more downwardly of the vehicle body than the mounting face 7A.

With the above arrangement, the right and left rear fenders 7 can be conveniently utilized as mounts for mounting other objects such as a bag holding therein f an amount of fertilizer or agent to be consumed during the implement work. And, notwithstanding or in addition to such convenient utilization of the rear fenders 7, it is still possible to avoid the PTO clutch lever 26 or a hand, gripping the grip portion 26A of this PTO clutch lever 26, from running the risk of coming into inadvertent contact with an object placed on the left rear fender 7.

As a result, improvement of the work efficiency through convenient utilization of the rear fenders 7 as mounts is made possible without affecting the operability of the PTO clutch lever 26.

Figure 15:
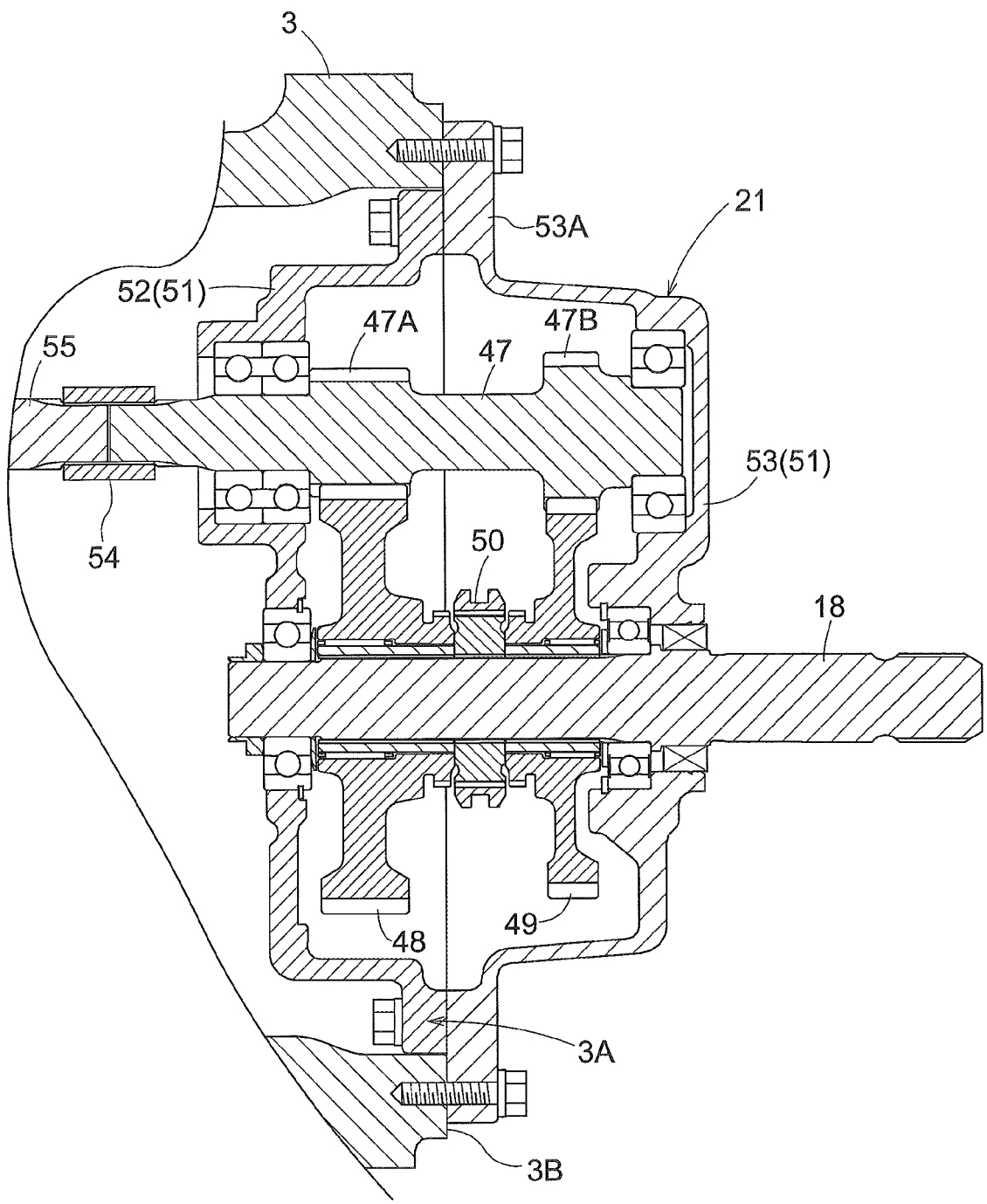
FIG. 15 shows the first embodiment and is a left side view in vertical section of principal portions showing the PTO speed changer device attached to a housing unit.

As shown in FIG. 15, the PTO speed changer device 21 includes a PTO drive shaft 47, the PTO shaft 18, a low speed gear 48, a high speed gear 49, a shift member 50, a casing 51, and so on. The PTO drive shaft 47 includes a low speed gear portion 47A for meshing the low speed gear 48, and a high speed gear portion 47B for meshing the high speed gear 49. The low speed gear 48 and the high speed gear 49 are rotatably fitted on the PTO shaft 18. The shift member 50 is fitted on the PTO shaft 18 to be slidable relative thereto and rotatable in unison therewith.

With the above arrangement in operation, in response to a sliding operation of the shift member 50, the PTO speed changer device 21 acts as a gear operable with the PTO shaft 18, and enters a low speed state when the low speed gear 48 is selected and enters a high speed state when the high speed gear 49 is selected.

The casing 51 comprises a two-separate component assembly that can be divided into a front case 52 and a rear case 53. The rear case 53 includes a flange 53A which comes into face contact with the rear end face of the housing unit 3 in water-proof manner and is bolt-connected thereto. The housing unit 3 includes, at its rear end face, an opening 3A that allows introduction of the front case 52, and a connecting portion 3B to which the flange 53A is bolt-connected. The PTO drive shaft 47 is detachably connected to an implement transmission shaft 55 inside the housing unit via a cylindrical relay shaft 54.

With the above, the PTO speed changer device 21 can be attached/detached to/from the housing unit 3 from the rear side of this housing unit 3.

Figure 16:
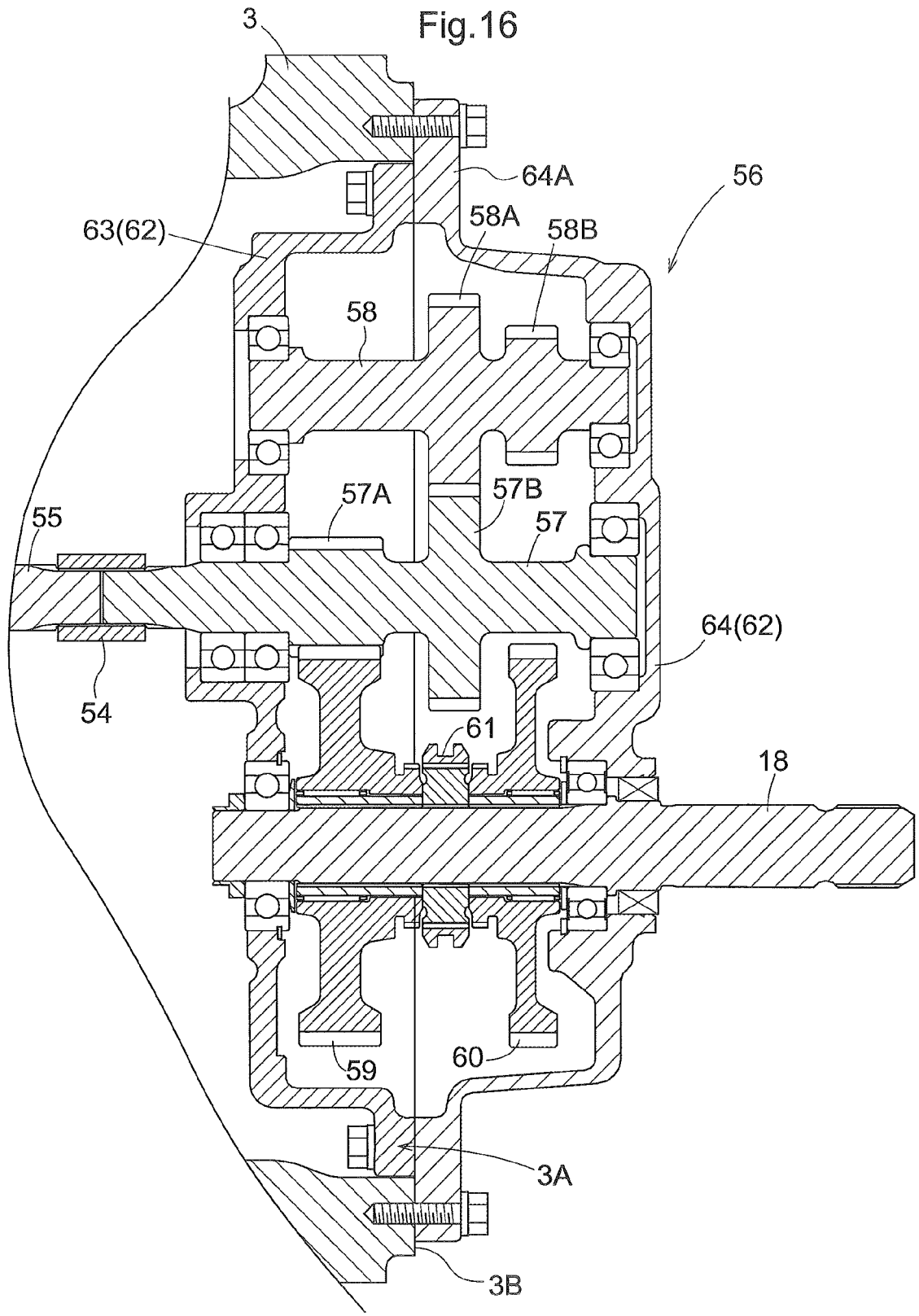
FIG. 16 shows the first embodiment and is a left side view in vertical section of principal portions showing a forward-reverse switchover device, in place of the PTO speed changer device, attached to the housing unit.

As shown in FIG. 16, this tractor includes, as an option thereof, a forward-reverse switching device 56 that allows switchover of the PTO shaft 18 between a forward rotational drive state and a reverse rotational drive state. The forward-reverse switching device 56 includes a PTO drive shaft 57, a reverse rotation shaft 58, the PTO shaft 18, a forward rotation gear 59, a reverse rotation gear 60, a shift member 61, a casing 62, and so on. The PTO drive shaft 57 includes a forward rotation gear portion 57A meshing with the forward rotation gear 59, and also includes a reverse rotation gear portion 57B. The reverse rotation shaft 58 includes a first reverse rotation gear portion 58A meshing with the reverse rotation gear portion 57B and a second reverse rotation gear portion 58B meshing with the reverse rotation gear 60. The forward rotation gear 59 and the reverse rotation gear 60 are fitted on the PTO shaft 18 rotatably relative thereto. The shift member 61 is fitted on the PTO shaft 18 to be rotatable in unison therewith and slidable relative thereto.

With the above arrangement in operation, in response to a sliding operation of the shift member 61, the forward-reverse switching device 56 acts as a gear operable with the PTO shaft 18 and enters a forward rotation drive state when the forward rotation gear 59 is selected or enters a reverse rotation drive state when the reverse rotation gear 60 is selected.

The casing 62 comprises a two-separate component assembly that can be divided into a front case 63 and a rear case 64. The rear case 64 includes a flange 64A which comes into face contact with the rear end face of the housing unit 3 in water-proof manner and is bolt-connected thereto. The flange 64A has a same shape as the flange 53A of the PTO speed changer device 21. The PTO drive shaft 57 is detachably connectable to the implement transmission shaft 55 inside the housing unit via the cylindrical relay shaft 54.

With the above, the forward-reverse switching device 56, in place of the PTO speed changer device 21, can be attached/detached to/from the housing unit 3 from the rear side of this housing unit 3.

Though not shown, when the PTO speed changer device 21 is replaced by the forward-reverse switching device 56, the PTO speed changer lever can be used to act as a PTO forward-reverse switching lever by replacing the PTO speed changing link mechanism, extending from the PTO speed changer lever to the operational arm of the PTO speed changer device 21, to a state where the PTO speed changing link mechanism extends from the PTO speed changer lever to the operational arm of the forward-reverse switching device 56.

Figure 17:
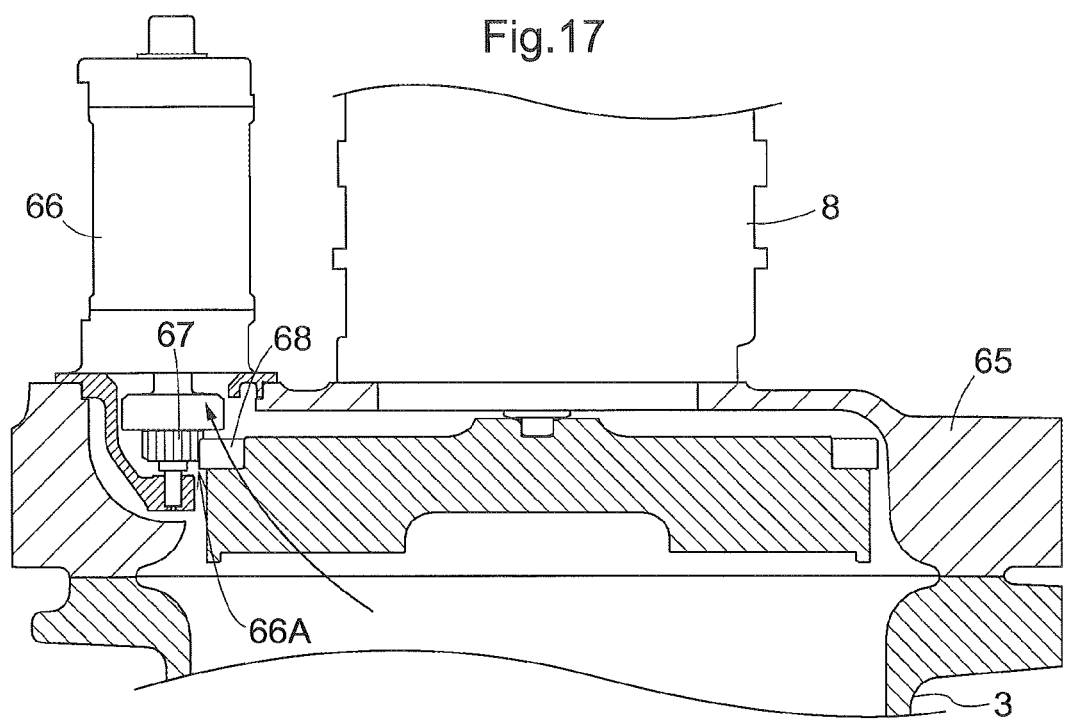
FIG. 17 shows the first embodiment and is a plan view in section of principal portions showing a ventilation arrangement of a starter.
Figure 18:
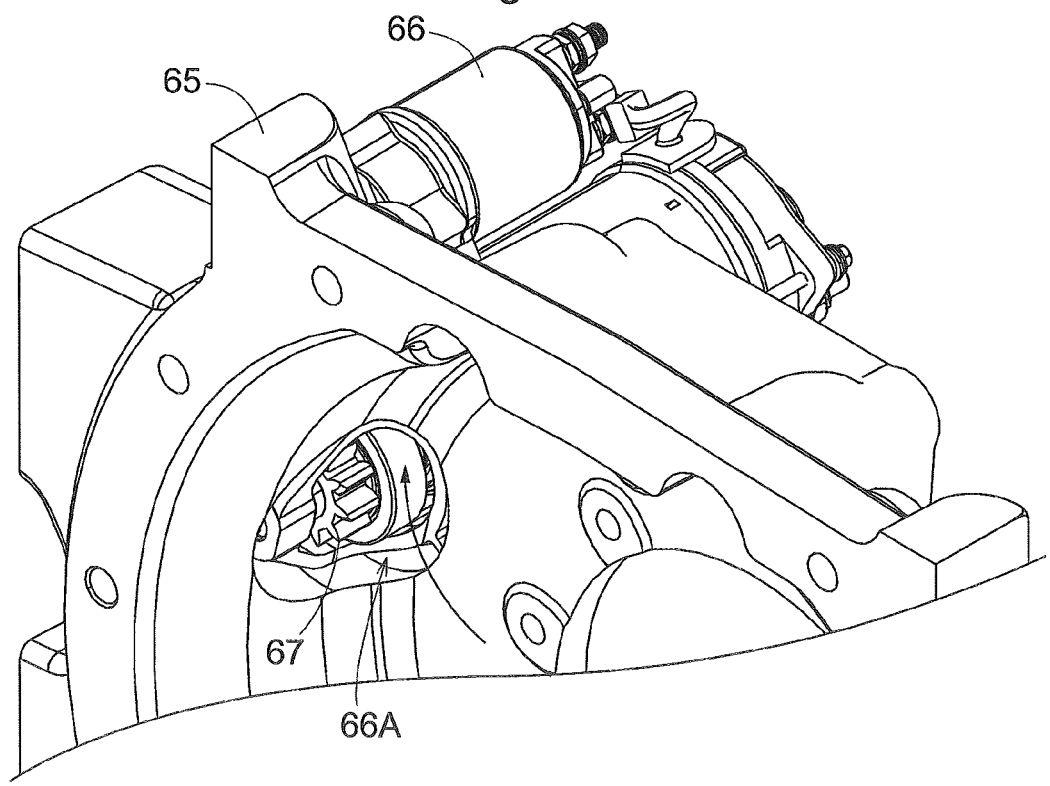
FIG. 18 shows the first embodiment and is a perspective view of principal portions showing the ventilation arrangement of the starter.

As shown in FIG. 17 and FIG. 18, the housing unit 3 includes, at its front upper portion, a ventilation breather (not shown). The housing unit 3 is connected to the engine 8 via a flywheel cover 65. The flywheel cover 65 includes, at its left portion, an engine starting starter 66 in a waterproof manner. The starter 66 includes an opening 66A that allows meshing between its pinion gear 67 and a ring gear 68 of the engine 8. The starter 66 has its inside communicated via its opening 66A to the inside of the housing unit 3.

With the above arrangement, ventilation of the starter 66 can be effected via e.g. the breather of the housing unit 3, the inside of the housing unit 3, the opening 66A of the starter 66, etc.

Figure 19:
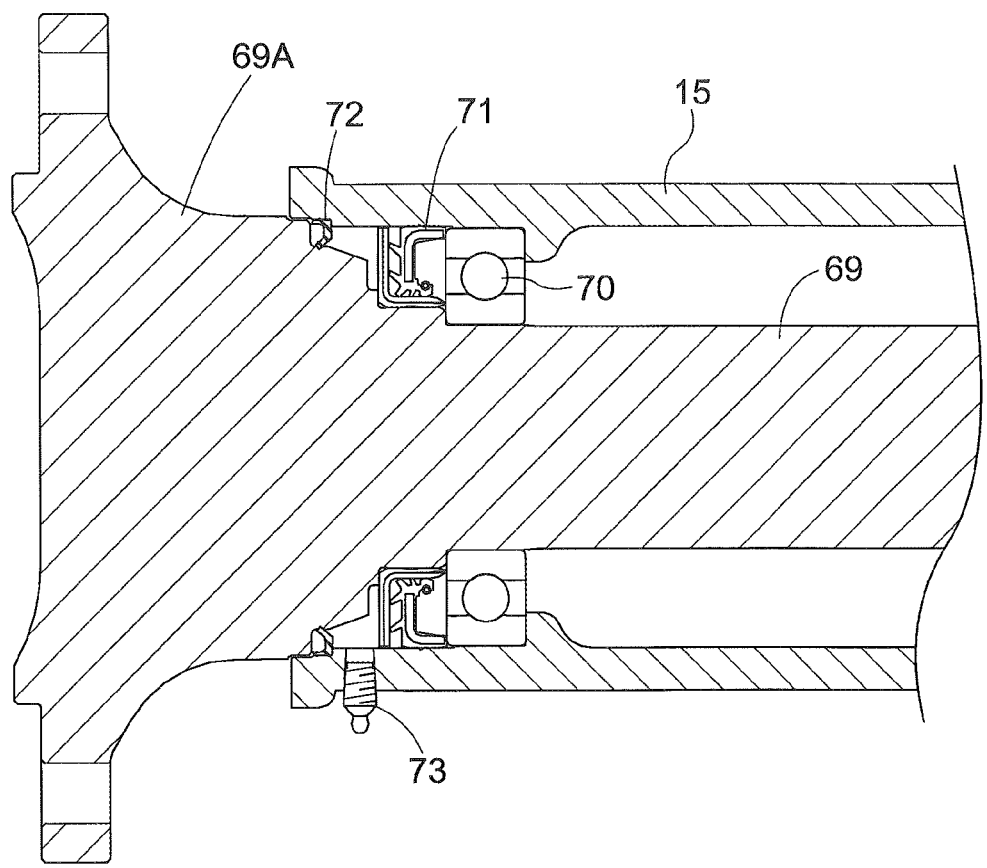
FIG. 19 shows the first embodiment and is a plan view in vertical section of principal portions showing a rear axle supporting arrangement of a rear axle case.

As shown in FIG. 19, the respective right/left rear axle case 15 includes, at its outer end portion, a bearing 70 that supports the outer end side of the rear axle 69, a shaft-including oil seal 71 adjacent on the vehicle body outer side of the bearing 70, a dust seal 72 disposed at a vehicle body outer side position spaced by a predetermined distance from the shaft-including oil seal 71, a grease injecting grease nipple 73 for injecting grease into the gap between the shaft-including oil seat 71 and the dust seal 72, and so on.

With the above arrangement, lubricant oil held inside the housing unit can fill to the disposing position of the bearing 70 disposed on the outer end side of the right/left rear axle case 15. Also, the grease can fill the gap between the shaft-including oil seal 71 and the dust seal 72. Moreover, intrusion of muddy water or the like into the rear axle cases can be prevented. As a result, it is possible to improve the durability of the rear axle 69 and the bearing 70, etc.

The right/left rear axle 69 includes a large diameter portion 69A which is disposed close to the inner circumferential face of the rear axle case 15 for sealing and covering the dust seal 72. With this, intrusion of muddy water or the like into the rear axle cases can be prevented even more effectively. As a result, it is possible to further improve the durability of the rear axle 69 and the bearing 70, etc.

Modified Embodiments of First Embodiment

Some representative modified embodiments of the first embodiment will be disclosed hereinafter.

[1-1] The plurality of operational levers 25, 26 can be disposed in right and left juxtaposition between the driver's seat 28 and the right rear fender 7.

[1-2] The inner operational lever 25 can be one of the main speed changer lever 24, the height setting lever, the PTO speed changer lever, etc.

[1-3] The outer operational lever 26 can be one of the differential lock lever, the PTO speed changer lever, etc.

[1-4] As the outer operational lever 26, there can be provided an operational lever capable of being switched to and retained at three positions in the vehicle body front-rear direction, such as a forward-reverse switching lever.

In this case, the outer operational lever 26 can be configured to be displaceable in the front-rear direction of the vehicle body and position-retainable among a first operational position on more vehicle body front side than an operational range of the inner operational lever 25, a second operational position on more vehicle body rear side than the operational range of the inner operational lever 25, and a third operational position on more vehicle body rear side than the second operational position.

Further, the outer operational lever 26 can be configured to be displaceable in the vehicle body front-rear direction and position-retainable among a first operational position on more vehicle body rear side than the operational range of the inner operational lever 25, a second operational position on more vehicle body front side than the operational range of the inner operational lever 25, and a third operational position on more vehicle body front side than the second operational position.

[1-5] As the outer operational lever 26, there can be provided an operational lever switchable to and retainable at three positions in the vehicle body front-rear direction such as the forward-reverse switching lever. Also, as the inner operational lever 25, there can be provided a first inner operational lever 25 whose operational range is set between the first operational position and the second operational position of the outer operational lever 26, and a second inner operational lever 25 whose operational range is set between the second operational position and the third operational position of the outer operational lever 26.

[1-6] As the outer operational lever 26, there can be provided a first outer operational lever 26 which is disposed on more rear fender side than the inner operational lever 25, and a second outer operational lever 26 which is disposed on more rear fender side than the first outer operational lever 26.

In the above arrangement, the first outer operational lever 26 will be configured to be displaceable in the vehicle body front-rear direction, and position-retainable at a first operational position which is on more vehicle body front side than the operational range of the inner operational lever 25, and a second operational position which is on more vehicle body rear side than the operational range of the inner operational lever 25, with the entire grip portion 26A thereof being disposed on more vehicle body upper side than the grip portion 25A of the inner operational lever 25.

The second outer operational lever 26 will be configured to be displaceable in the vehicle body front-rear direction, and retainable at a first operational position which is on more vehicle body front side than the first operational position of the first outer operational lever 26, and a second operational position which is on more vehicle body rear side than the second operational position of the first outer operational lever 26, with the entire grip portion 26A thereof being disposed on more vehicle body upper side than the grip portion 26A of the first outer operational lever 26A.

[1-7] The outer operational lever 26 and the inner operational lever 25 can be configured to be pivotable in the vehicle body front-rear direction about respective dedicated right-left oriented first support shafts 30.

[1-8] The outer operational lever 26 can be set under a posture wherein the posture of its grip portion 26A extends straight along the rear fender 7.

[1-9] The outer operational lever 26 can have its upper end positioned on more vehicle body upper side than the upper end of the rear fender 7.

[1-10] The inner operational lever 25 and the outer operational lever 26 can have their upper ends located on more vehicle body upper side than the upper end of the rear fender 7.

[1-11] The right and left rear fenders 7 may not have the mount faces 7A at their upper ends.

[1-12] Aside from the tractor as described above, the riding work vehicle can also be a riding work vehicle such as a riding grass mower and a riding rice planter, having a plurality of operational levers disposed adjacent each other in the right-left direction between the driver's seat and one of the right and left rear fenders.

Second Embodiment

A second embodiment will be described hereinafter.

Figure 20:
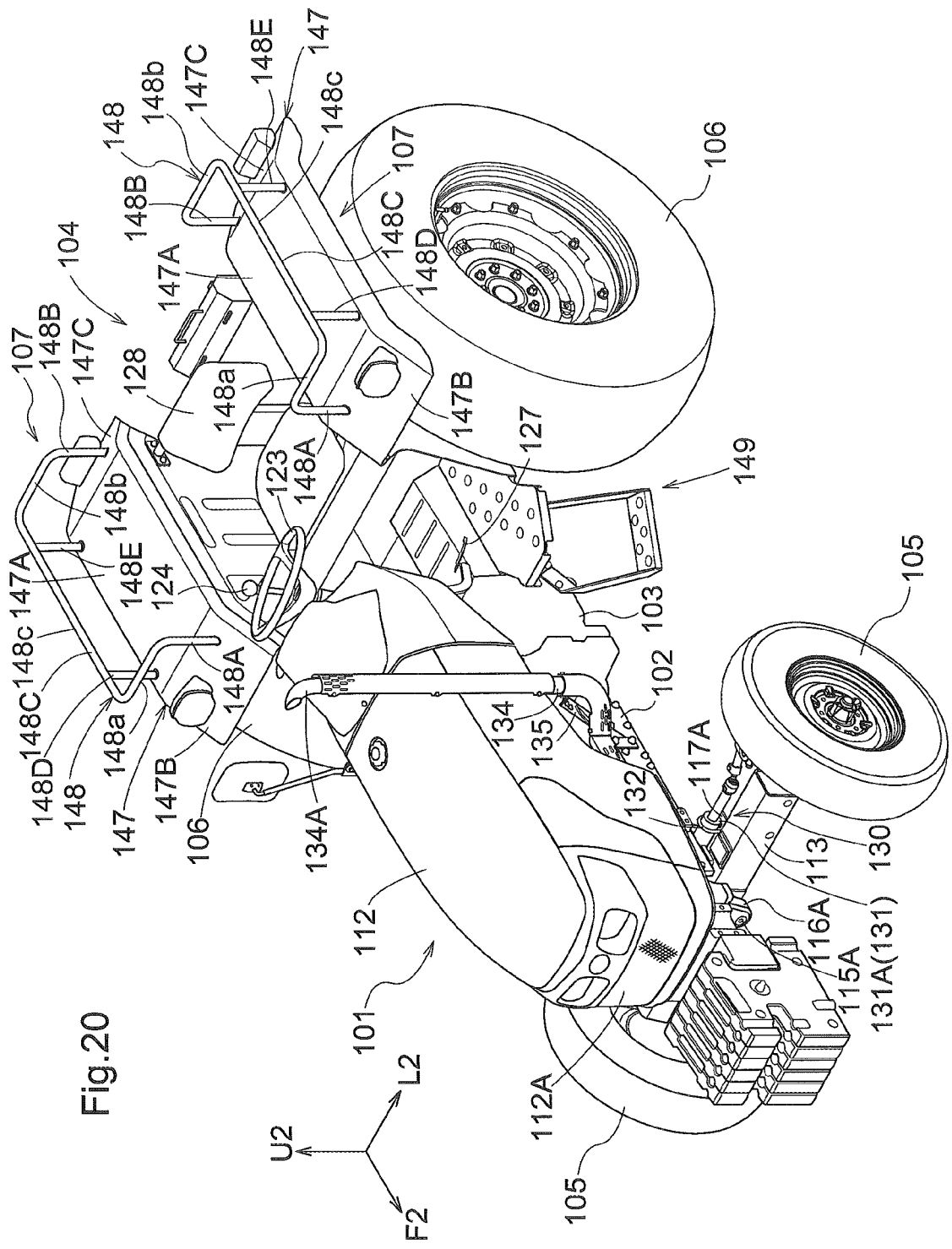
FIG. 20 shows a second embodiment and is a perspective view showing a tractor.

In the following description, a direction denoted with an arrow of a mark F2 in FIG. 20 is the front side of the tractor, a direction denoted with an arrow of a mark L2 is the left side of the tractor, and a direction denoted with an arrow of a mark U2 is the upper side of the tractor.

As shown in FIGS. 20-23, a tractor illustrated in this second embodiment includes an engine section 101 disposed at a front half portion of the vehicle body, a front portion frame 102 supporting the engine section 101, a housing unit 103 acting also as a rear portion frame, a riding type driving section 104 disposed at a rear half portion of the vehicle body, right and left front wheels 105 disposed on the right and left sides of the engine section 101, right and left rear wheels 106 disposed on the right and left sides of the engine section 101, right and left rear fenders 107 covering the right and left rear wheels 106, and so on.

Figure 21:
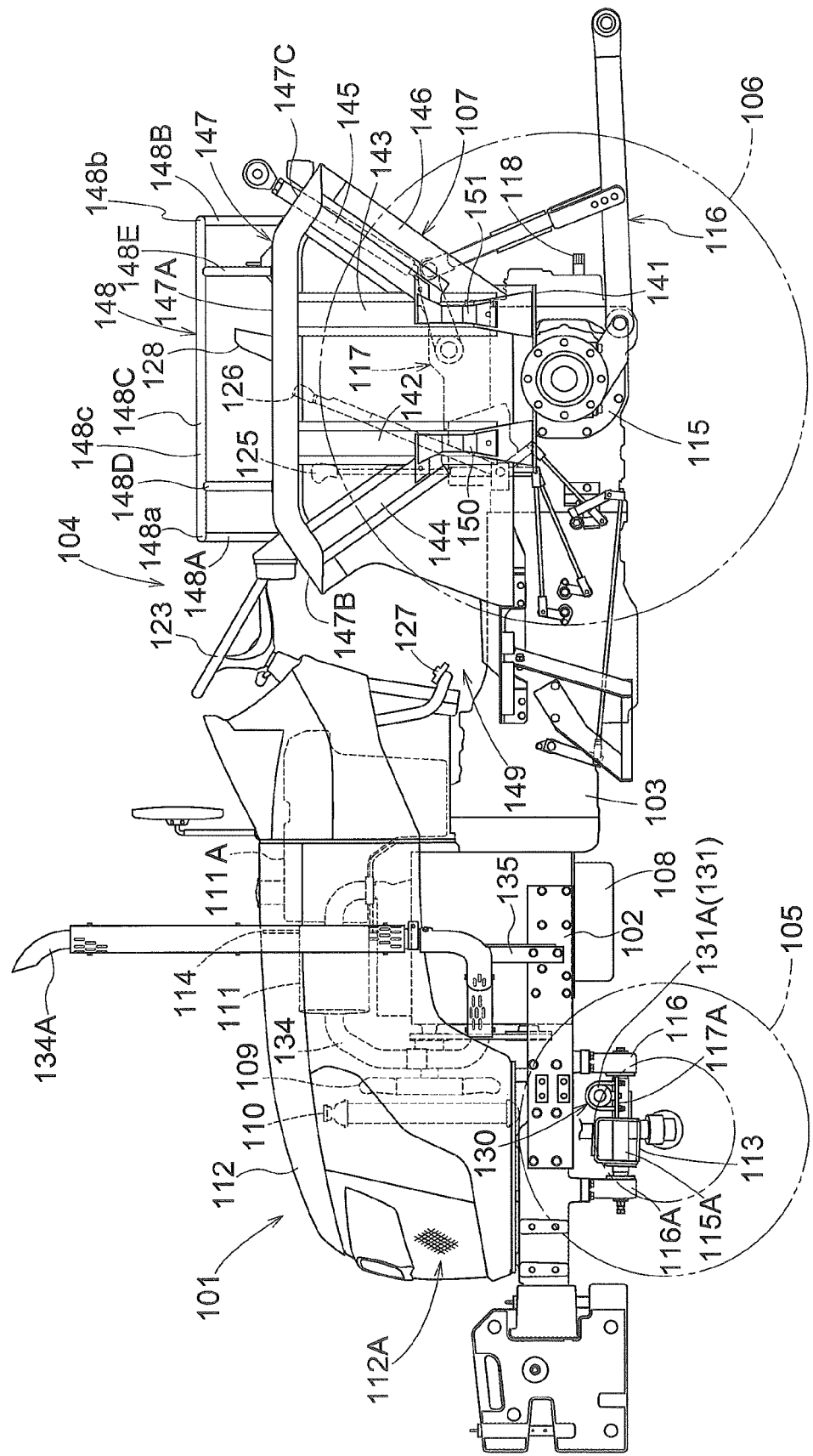
FIG. 21 shows the second embodiment and is a left side view showing the tractor.
Figure 22:
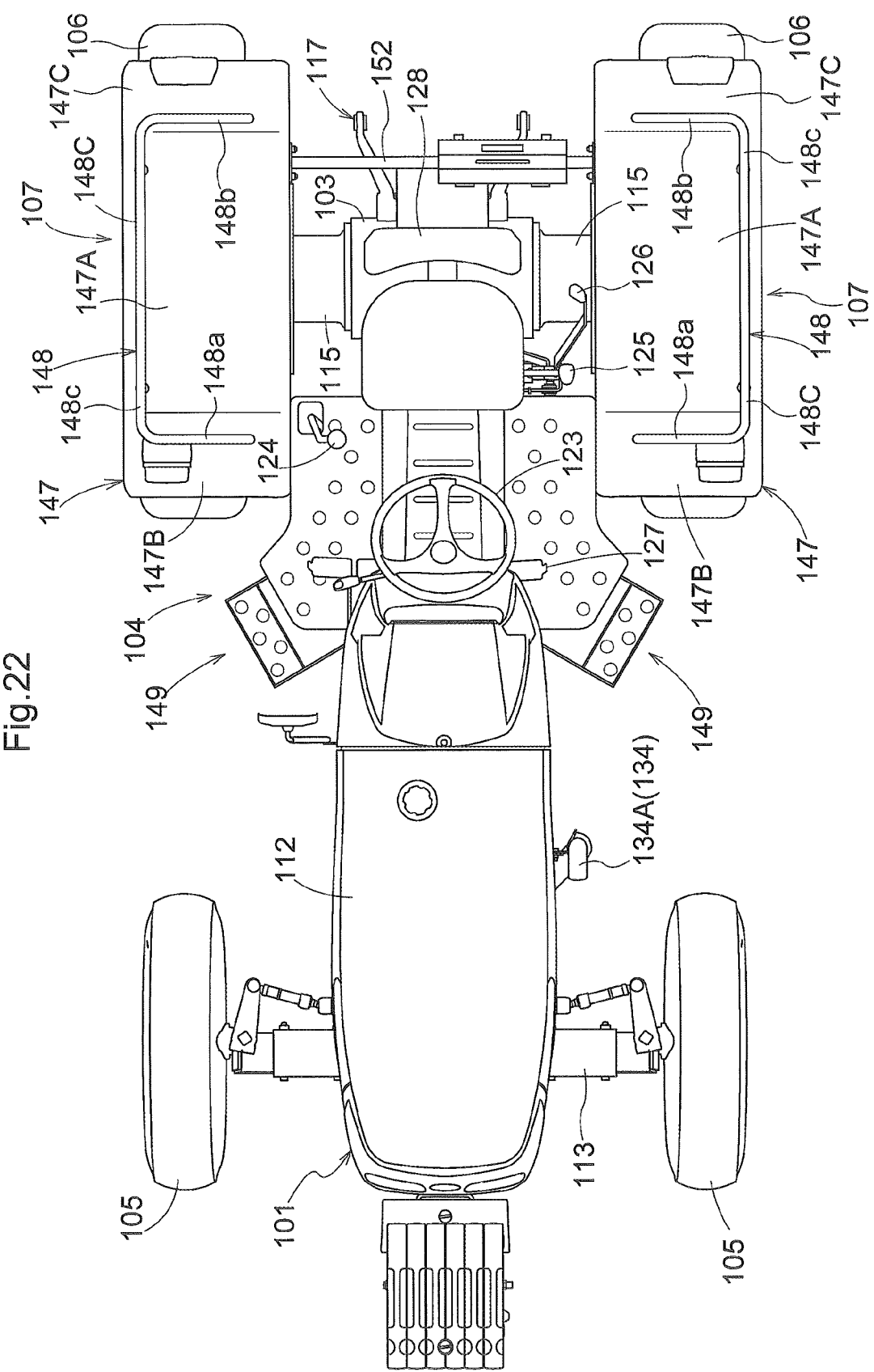
FIG. 22 shows the second embodiment and is a plan view showing the tractor.

As shown in FIGS. 20-22, the engine section 101 includes an engine 108 disposed at a rear portion of the engine section 101, a cooling fan 109 disposed forwardly of the engine 108, a radiator 110 disposed forwardly of the cooling fan 109, a muffler 111 disposed on the left side of the engine 108 to act as an exhaust gas treating device, a fuel tank 111A formed of resin, a pivotally openable/closable hood 112 covering the above-mentioned members, etc. The cooling fan 109, when operated, introduces ambient air into the hood 112 via an intake portion 112A provided at a front end of the hood 112 and feeds the introduced ambient air as cooling air to the radiator 110 and the engine 108 that are disposed rearwardly thereof.

Figure 24:
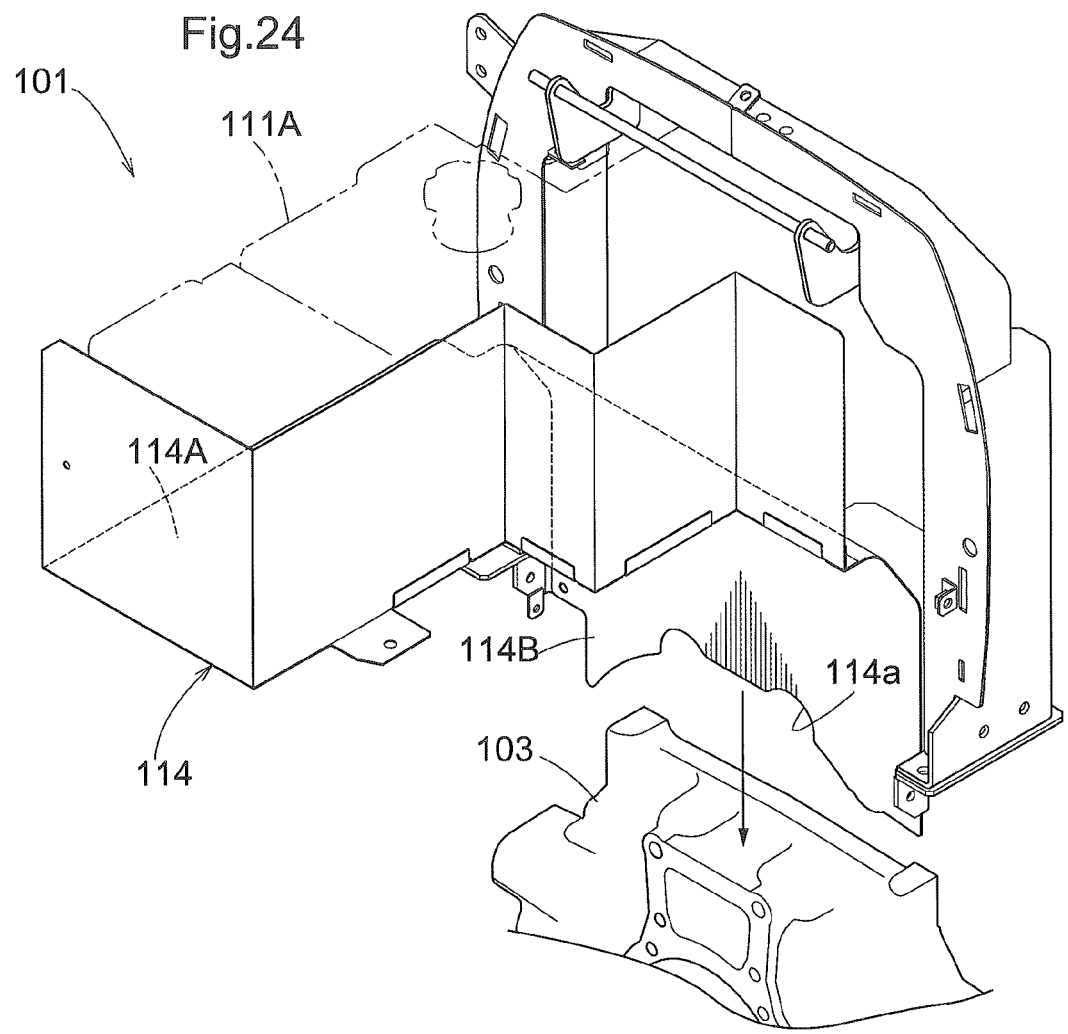
FIG. 24 shows the second embodiment and is a perspective view of principal portions showing a shape of a wind shield plate, etc.
Figure 25:
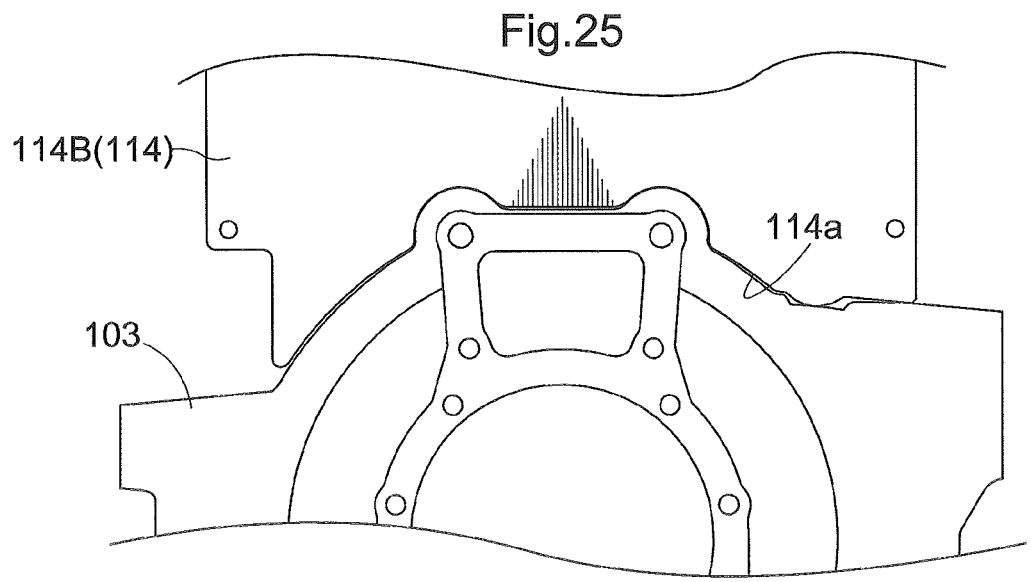
FIG. 25 shows the second embodiment and is a front view of principal portions showing the shape of the wind shield plate, etc.

As shown in FIG. 21, FIG. 24 and FIG. 25, the fuel tank 111A has an "L"-letter shape as seen in its plan view, extending from the space between the driving section 104 and the engine 108 upwardly of the housing unit 103 to the space on the right upper side of the engine 108. A heat shielding plate 114 is disposed between the engine 108 and the fuel tank 111A.

The heat shielding plate 114 includes a flat face portion 114A acting also as a mount for the fuel tank 111A, a vertical wall portion 114B acting as a wind shielding plate. The vertical wall portion 114B is formed with its lower end edge 114a being formed upwardly concave along the outer face of the housing unit 103 opposed thereto.

With the above arrangement, it is possible to reduce a gap which is formed between the lower end edge 114a of the vertical wall portion 114B and the outer face of the housing unit 103.

Namely, by using the vertical wall portion 114B of the heat shielding plate 114 to act also as a wind shielding plate, the number of components is reduced. At the same time, it is possible to suppress inconvenience of cooling air, having heated after cooling the engine, flowing out to the driving section side through the gap between the vertical wall portion 114B and the housing unit 103.

As shown in FIG. 20, FIG. 21, FIG. 26 and FIG. 27, the front portion frame 102 includes, at its bottom portion, front and rear holders 116A for rotatably supporting a front-rear oriented support shaft 115A. The support shaft 115A is fixed at a right-left center portion of a right-left oriented support shaft 113. The front wheel support shaft 113 supports, at its right and left opposed ends, the right and left front wheels 105 with allowing steering thereof. With this, the front portion frame 102 supports the right and left front wheels 105 with allowing rolling thereof about the front-rear oriented support shaft 115A.

Figure 27:
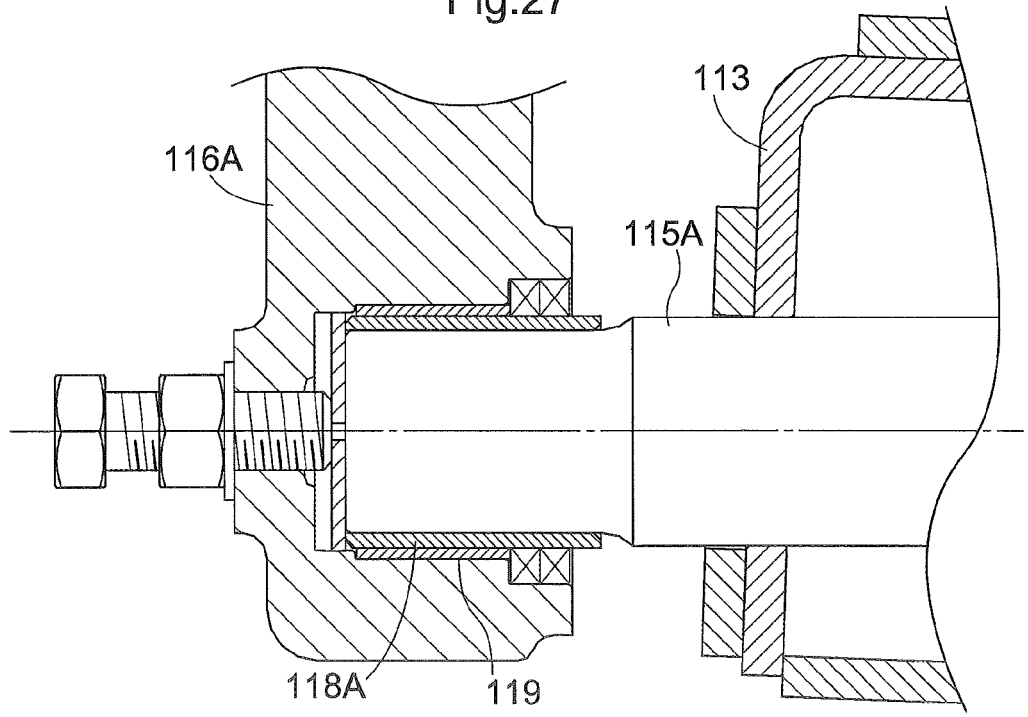
FIG. 27 shows the second embodiment and is a left side view in vertical section of principal portions showing a supporting arrangement of a support shaft that supports right and left front wheels with allowing rolling thereof.

As shown in FIG. 27, the front-rear oriented support shaft 115A mounts protection sleeves 118A driven thereto at its opposed ends. The front/rear holder 116A includes a bush 119 which is rotatably fitted on the sleeve 118A.

With the above arrangement, when muddy water has entered the respective holder 116A, friction due to such intrusion will occur between the sleeve 118A and the bush 119, so that frictional wear of the support shaft 115A due to intrusion of muddy water can be prevented.

As a result, maintenance for such frictional wear due to muddy water intrusion to the inside of the respective holder 116A can be coped with by simple replacement of the sleeve 118A or the bush 119 which are less expensive than the support shaft 115A.

Figure 23:
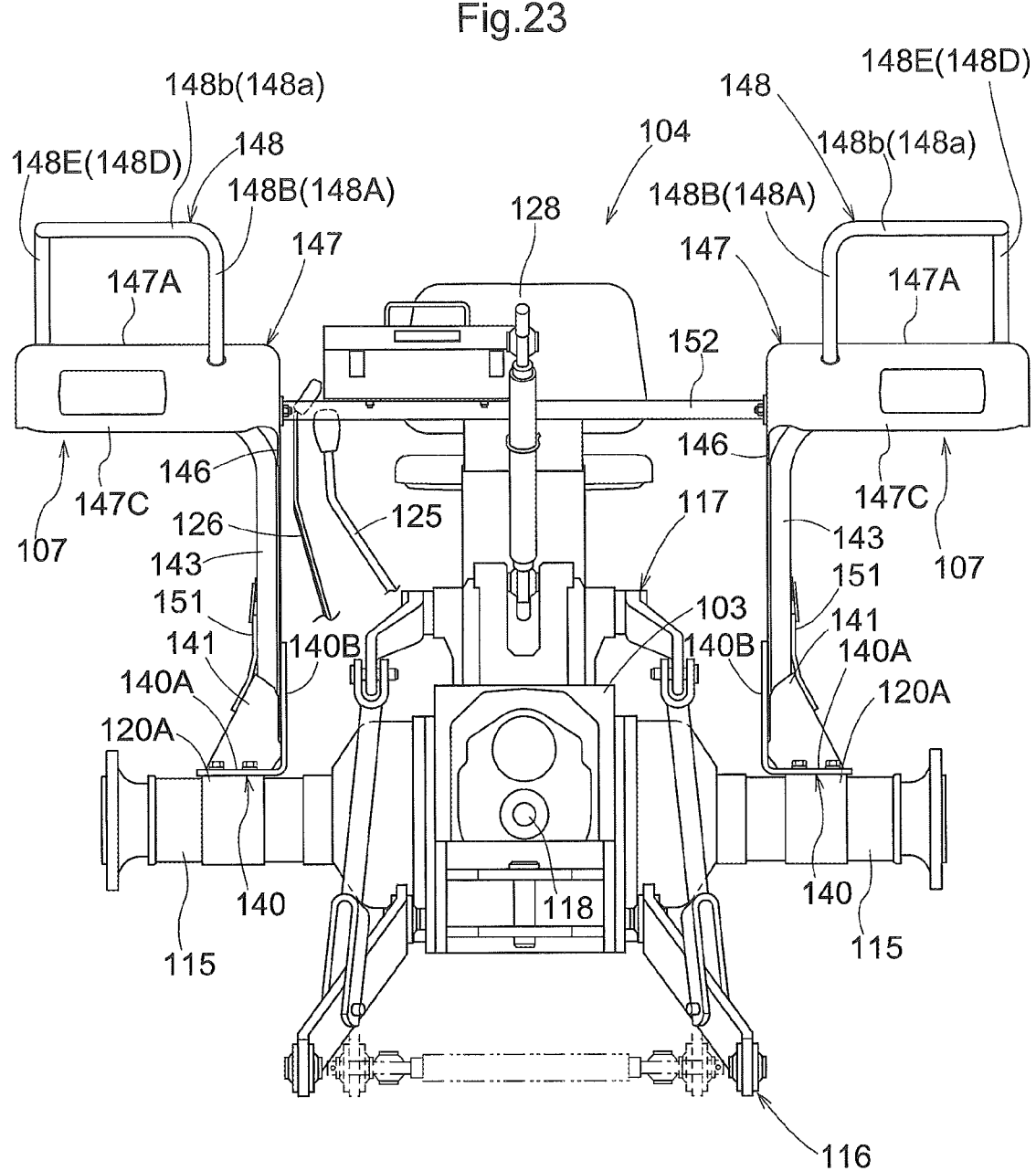
FIG. 23 shows the second embodiment and is a rear view showing principal portions of the tractor.

As shown in FIGS. 21-23, the housing unit 103 includes, at a rear portion thereof, right and left rear axle cases 115 extending to the right and left sides, an implement-coupling link mechanism 116, an elevation/lowering unit 117 of electronic hydraulic control type for elevating/lowering an implement (not shown) via the link mechanism 116, a PTO (power takeoff) shaft 118 that allows takeoff of work power for the implement, etc.

As shown in FIGS. 20 through 23, the driving section 104 includes a steering wheel 123 for steering the front wheels, a main speed changer lever 124, an auxiliary speed changer lever 125, a PTO clutch lever 126, a clutch pedal 127, a driver's seat 128 disposed between right and left rear fenders 107, and so on.

Figure 26:
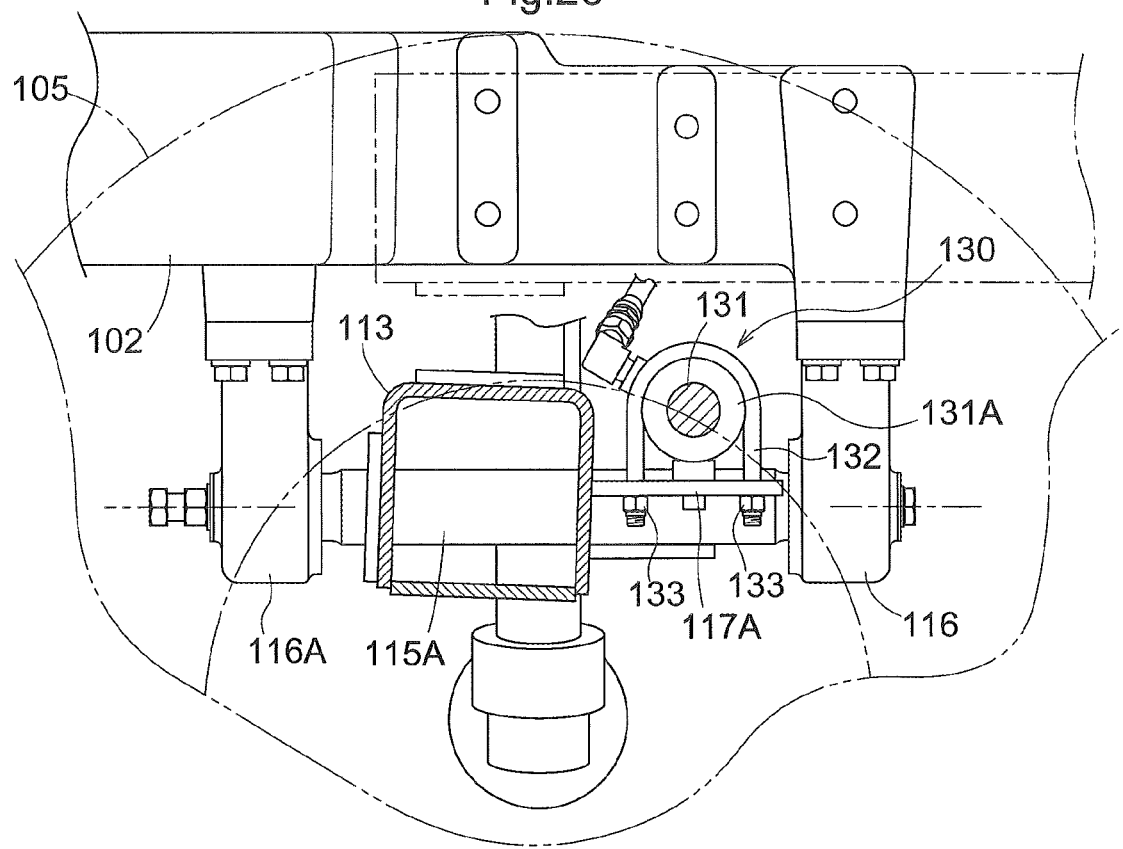
FIG. 26 shows the second embodiment and is a left side view in vertical section of principal portions showing a fixing arrangement of a steering cylinder.

As shown in FIG. 20, FIG. 21 and FIG. 26, the steering wheel 123 is operably linked to the right and left front wheels 105 via a full-hydraulic type power steering unit (to be referred to as "PS unit" hereinafter). The PS unit 130 includes a double-action type steering cylinder 131 for steering the right and left front wheels 105, a control unit (not shown) for controlling flow of oil to the steering cylinder 131 in response to an operation of the steering wheel 123, and so on.

The steering cylinder 131 has its cylinder tube 131A placed on right and left support portions 137A provided at rear portions of the rear portion of the front wheel support member 13 and under this state, the cylinder 131 is fixed by right and left U-shaped bolts 132 and four anti-rotation nuts 133.

By using the anti-rotation nuts 113 for fixation of the cylinder tube 131A in such a manner, compared with double nuts being used instead of the anti-rotation nuts 133, it is possible to reduce the number of works required for fixation of the cylinder tube 131A. Also, torque management at the time of nut fastening becomes easier.

As a result, efficiency of work is improved when fixing the cylinder tube 131A of the steering cylinder 131 to the right/left support portion 117A. Also, it is possible to avoid the risk of insufficient anti-loosening effect, due to an inconsistent fastening degree depending on a worker involved in fixation of the cylinder tube 131A, which would occur in the case of using the double nut.

As shown in FIGS. 20-22, FIG. 28 and FIG. 29, the muffler 111 includes an exhaust pipe 134 which extends out from its exhaust portion. The exhaust pipe 134 includes an external exhaust portion 134A which extends long upwards at the left outer side portion of the hood 112. The external exhaust portion 134A has its lower end portion supported by a support arm 135 that extends to the left upper side from the left end portion of the front portion frame 102.

Figure 28:
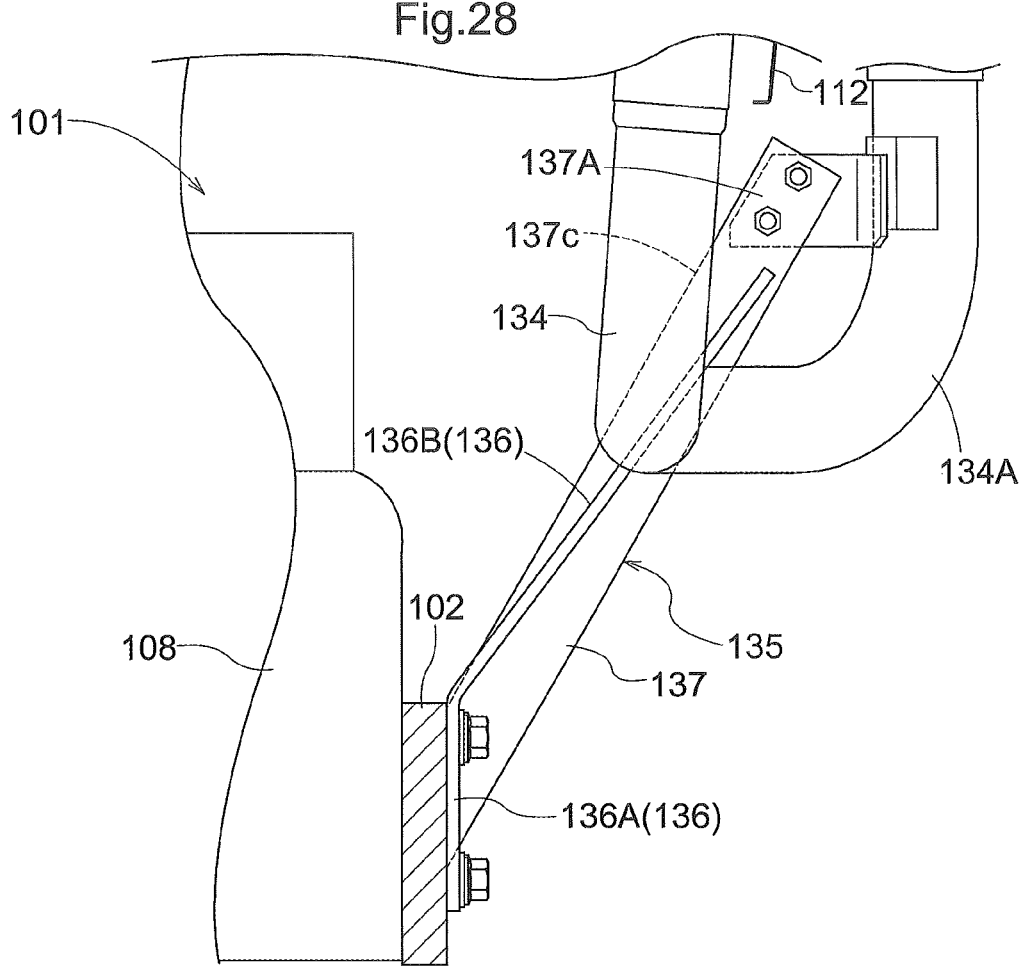
FIG. 28 shows the second embodiment and is a front view in vertical section of principal portions showing arrangement of a support arm that supports an external exhaust portion.
Figure 29:
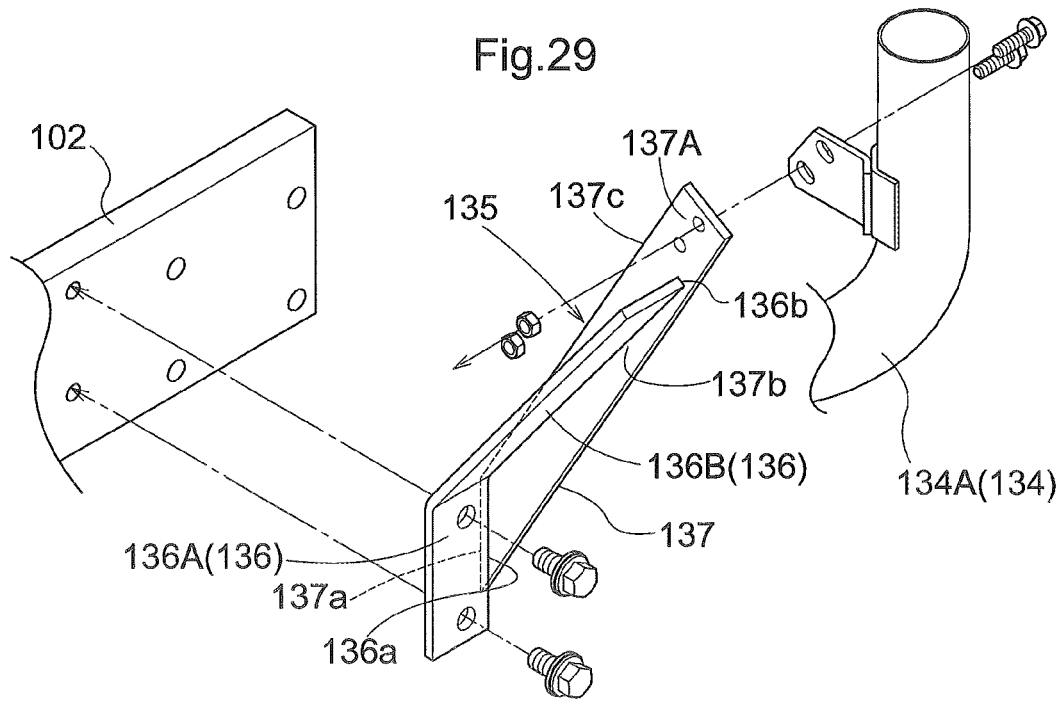
FIG. 29 shows the second embodiment and is an exploded perspective view of principal portions showing the arrangement of the support arm that supports the external exhaust portion.

As shown in FIG. 28 and FIG. 29, the support arm 135 includes a first band-like steel plate 136 connected to the front portion frame 102, and a second band-like steel plate 137 connected to the external exhaust portion 134A. The first band-like steel plate 136 includes a vertically oriented connecting portion 136A along the left side face of the front portion frame 102, and an extension portion 136B extending straight to the left upper side from the upper end of the connecting portion 136A. The first band-like steel plate 136 is connected to the front portion frame 102, with a bend-width direction thereof aligned with the front-rear direction of the vehicle body. The second band-like steel plate 137 is connected to the rear end of the first band-like steel plate 136, with a band-width direction thereof aligned with the right-left direction of the vehicle body. The second band-like steel plate 137 has its upper end portion 137A connected to the external exhaust portion 134A.

In the first band-like steel plate 136, a rear end edge 136a of the connecting portion 136A is welded to a rear end edge 137a of the second band-like steel plate 137. Also, in the first band-like steel plate 136, the lower end of the extension portion 136B is located at the upper end of the right end edge 137a of the second band-like steel plate 137 and also the upper end of the extension portion 136B is located on more left side than the band-width center of the second band-like steel plate 137 in the vicinity of the upper end portion 137A of the second band-like steel plate 137; and under this state, the rear end edge 136b of the extension portion 136B is welded to a front face 137b of the second band-like steel plate 137.

With the above arrangement, compared with e.g. welding the rear end edge 136b of the extension portion 136B to the right upper edge 137c of the second band-like steel plate 137, co-vibration of the support arm 135 with the external exhaust portion 134A in the vehicle body front-rear direction will occur less likely.

As a result, it becomes possible to suppress stress concentration at the upper end portion 137A of the second band-like steel plate 137, where the support arm 135 will be connected to the external exhaust portion 134A, to thereby prevent crack at the upper end portion 137A due to such stress concentration.

As shown in FIGS. 20-23 and FIGS. 30-34, the right/left rear axle case 115 includes a rear fender connecting portion 120A. The right/left rear fender 107 includes: a connecting member 140 connected to the connecting portion 120A and having an "L"-letter shape as seen in the front-rear direction; front and rear reinforcing members 141, each extending between a flat face portion 140A and a vertical wall portion 140B of the connecting member 140; a front side strut member 142 and a rear wide strut member 143, each extending upwards from the reinforced potion of the connecting member 140 by the reinforcing member 141 associated therewith; a first extension member 144 extending from the first strut member 142 to the front upper side; a second extension member 145 extending from the first strut member 142 to the rear upper side; a side plate 146 covering the rear wheel 106 from the vehicle body inner side; a top plate 147 covering the rear wheel 106 from above, and so on.

Each of the reinforcing members 141 has a base-widened shape with its right-left width and its front-rear width increasing to the lower side. Each of the strut member 142, 143 and each of the extension members 144, 145 includes a vertically oriented support portion 142A-145A to which the side plate 146 is welded, and a right-left oriented support portion 142B-145B to which the top plate 147 is welded.

As shown in FIGS. 20-23 and FIG. 30 and FIG. 31, the right/left top plate 147 respectively includes a horizontal flat face portion 147A, a front side extension portion 147B extending forwardly downwards from the front end of the flat face portion 147A, a rear extension portion 177C extending rearwardly downwards from the rear end of the flat face portion 147A, and so on.

With the above arrangement, in the right/left rear fender 107, the top plate 147 having the flat face portion 147 can be used respectively also as a mount for mounting other objects such as a bag holding therein an amount of fertilizer or agent to be consumed during the implement work.

The right/left rear fender 107 includes a guard member 148 for preventing fall of an object from the right/left top plate 147 to the outside. The right/left guard member 148 is bent to include: a front side first leg portion 148A extending upwards from the front side extension portion 147B; a rear side second leg portion 148B extending upwards from the rear side extension portion 147C; and a guard portion 148C having a U-shape as seen its plan view, and extending between the first leg portion 148A and the second leg portion 148B. The guard portion 148C has a right-left oriented front end guard portion 148a which is located on more vehicle body front side than the front end of the flat face portion 147A. The guard portion 148C further has a right-left oriented rear end guard portion 148b which is located on more vehicle body rear side than the rear end of the flat face portion 147A.

With the above arrangement, it becomes possible to place an object having a length greater than the front-rear length of the flat face portion 147A of the top plate 147 on each top plate 147. As a result, convenience of the top plate 147 as a mount can be enhanced.

Further, when a driver gets on/off the vehicle through a getting on/off (access) portion 149 disposed immediately forwardly of the respective rear fender 107, the front end guard portion 148a can be utilized as a handgrip for getting on/off, since the front end guard portion 148a of each guard member 148 is disposed under the front-rear oriented posture that allows easy gripping thereof by the driver getting on/off through the getting on/off portion 149 and is positioned closer to the getting on/off portion 149 than the front end of the flat face portion 147A. As a result, ease of getting on/off the vehicle can be improved with achievement of simplification of the arrangement at the same time.

In the right/left guard member 148, a front side third leg portion 148D and a rear side fourth leg portion 148E, extending from the lateral side guard portion 148c to the flat face portion 147A, are continuously connected to a front-rear oriented lateral end guard portion 148c in the guard portion 148C. This can increase the strength as the guard member 148.

Figure 31:
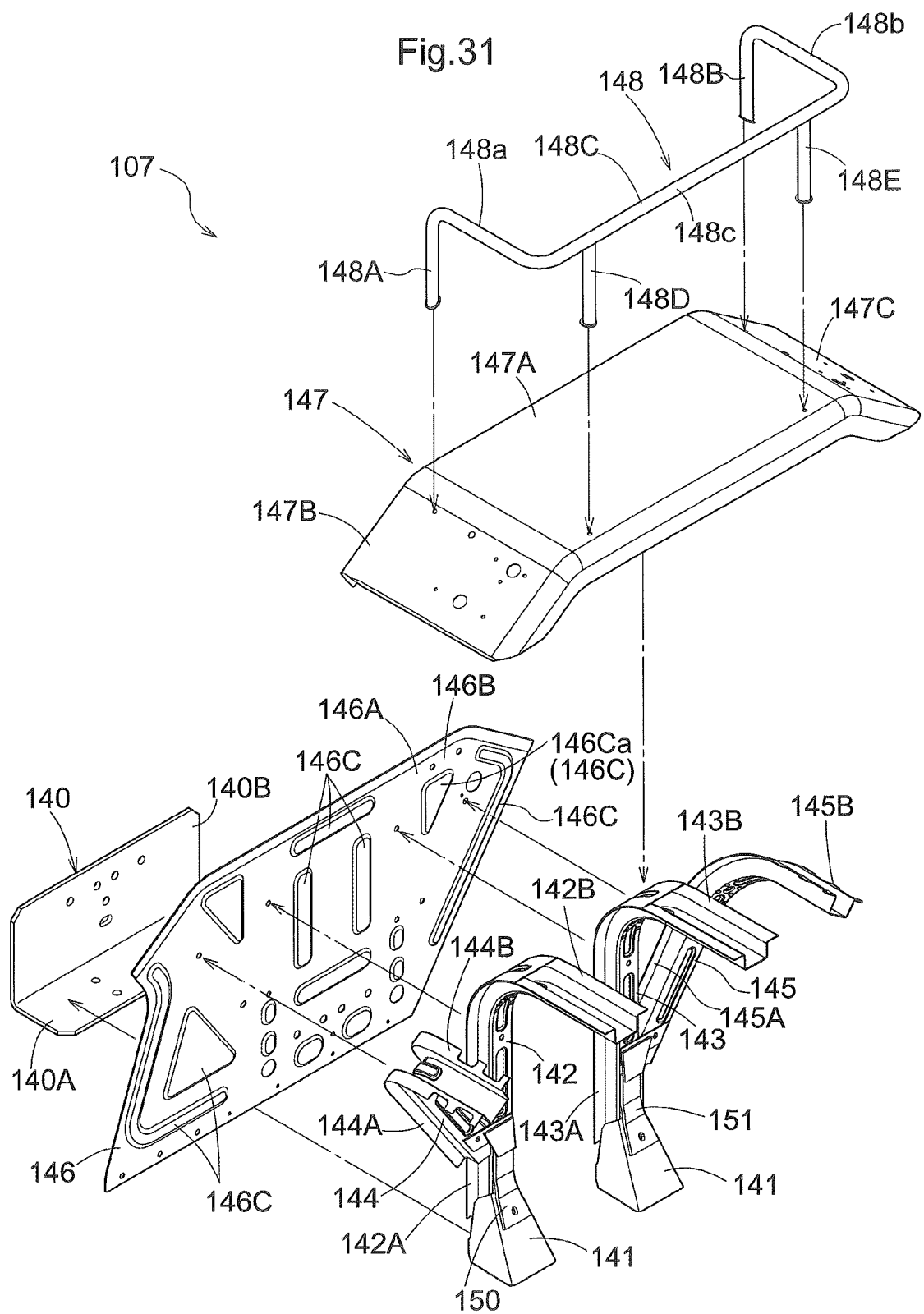
FIG. 31 shows the second embodiment and is an exploded perspective view showing arrangement of a left rear fender.
Figure 32:
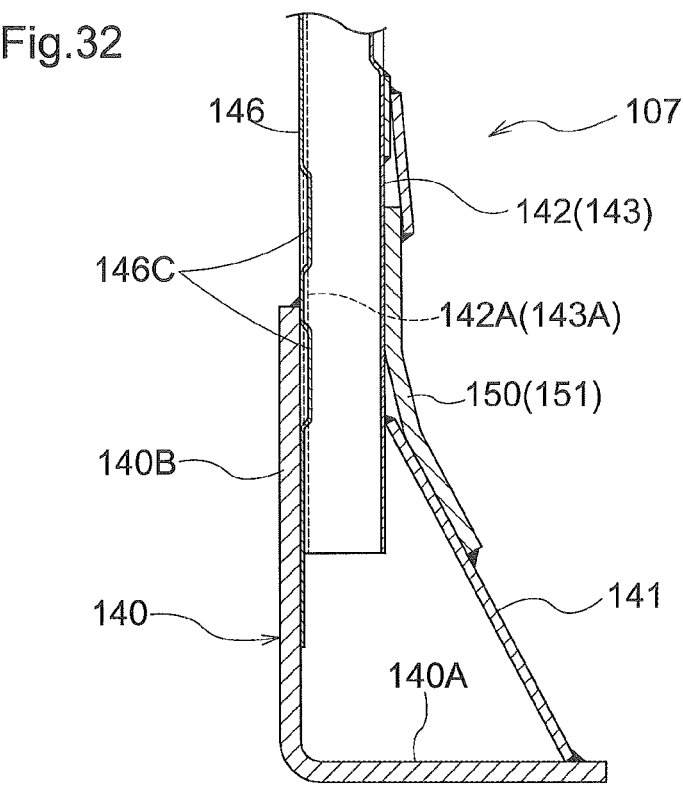
FIG. 32 is a view in section taken along XXXII-XXXII in FIG. 30.
Figure 33:
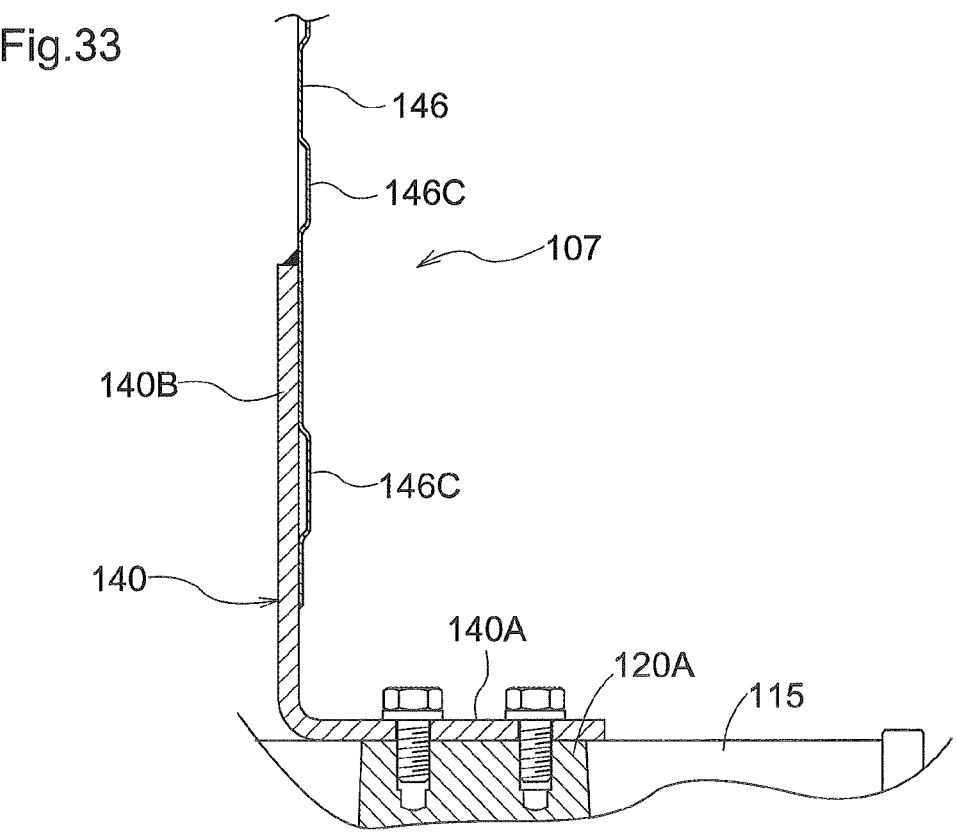
FIG. 33 is a view in section taken along XXXIII-XXXIII in FIG. 30.
Figure 34:
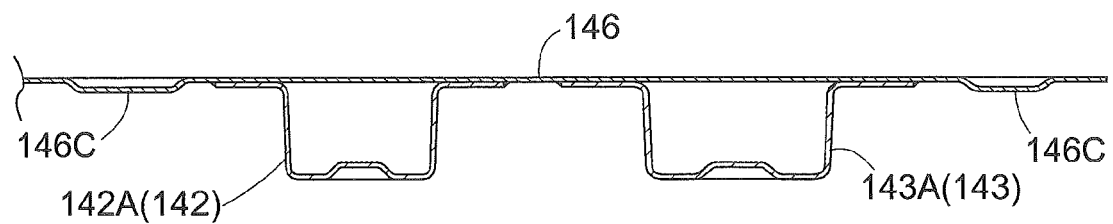
FIG. 34 is a view in section taken along XXXIV-XXXIV in FIG. 30.

As shown in FIG. 20, FIG. 22 and FIG. 31, the first leg portion 148A is fixed to a driver's seat side end portion of the front side extension portion 147B. With this, the length of the front side guard member 148a can be increased, whereby the front end guard portion 148a can be used as a handgrip for getting on/off easily.

The first leg portion 148A is connected continuously to the driver's seat side end portion of the front end guard portion 148a. With this, compared with e.g. the first leg portion 148A being connected continuously to a right-left intermediate portion of the front end guard portion 148a, gripping of the front end guard portion 148a is made easier.

As a result, the front end guard portion 148a can be used as a handgrip for getting on/off more easily.

As shown in FIG. 21, FIG. 23 and FIGS. 30-32, the right/left rear fender 107 includes, on the vehicle body outer side thereof, a first reinforcing plate 150 welded to/between the front end reinforcing member 141 and the first strut member 142, and a second reinforcing plate 151 welded to/between the rear side reinforcing member 141 and the second strut member 143.

With the above arrangement, the lower side of each rear fender 107 can be reinforced, without providing an additional reinforcing member on the vehicle body inner side of the rear fender 107.

As a result, the lower side of the respective rear fender 107 can be reinforced to have sufficient strength so that the top late 147 can be used as a mount, without affecting e.g. the layout of the auxiliary speed changer lever 125 and the PTO clutch lever 126 between the left rear fender 107 and the driver's seat 128, or the layout of the main speed changer lever 124 between the right rear fender 107 and the driver's seat 128.

As shown in FIG. 22, FIG. 23, FIG. 30 and FIG. 31, the right/left side plate 146 has a connecting portion 146B, to which a crossbar 152 extending between the right and left side plates 146 is to be connected, at an upper end portion of an approximately triangular-shaped lateral wall portion 146A surrounded by the second strut member 143, the second extension member 145 and the top plate 147.

As shown in FIGS. 30-33, the right/left side plate 146 defines a plurality of reinforcing beads 146C. Whereby, each side plate 146 can be reinforced to have sufficient strength so that the top plate 147 can be used as a mount, while suppressing increase in the number of components.

Figure 30:
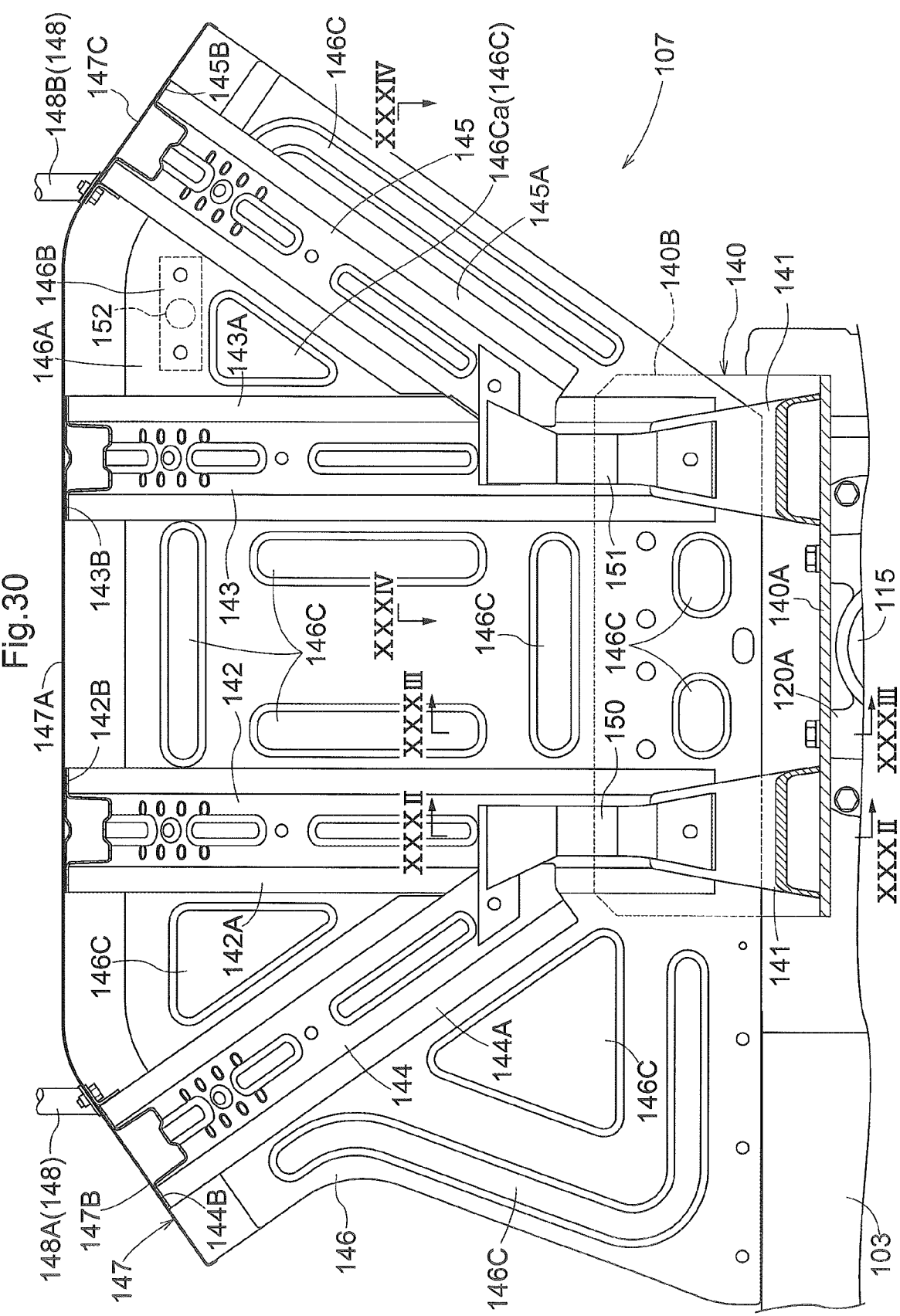
FIG. 30 shows the second embodiment and is a left side view in vertical section of principal portions showing arrangement of a rear fender.

As shown in FIG. 30 and FIG. 31, the plurality of beads 146C include a reinforcing bead 146Ca, disposed at the lateral wall portion 146A of the respective side plate 146, to have an approximately triangular shape close to the second strut member 143, the second extension portion 145 and the connecting portion 146B.

With the above arrangement, when an object is placed on the top plate 147, the stress applied to the second strut member 143 and the second extension member 145 can be distributed to the connecting portion 146B that is connected with the crossbar 152, whereby the load applied to the second strut member 143 and the second extension member 145 can be reduced.

As a result, the durability of the rear fender 107 can be improved, while using the top plate 147 of the respective rear fender 107 as a mount.

Modified Embodiments of Second Embodiment

Some representative modified embodiments of the first embodiment will be disclosed hereinafter.

[2-1] The front side extension portion 147B of the right/left rear fender 107 can be formed in an arcuate shape extending from the front end of the flat plate portion 147A with a curve to the front lower side.

[2-2] The rear side extension portion 147C of the right/left rear fender 107 can be formed in an arcuate shape extending from the rear end of the flat plate portion 147A with a curve to the rear lower side.

[2-3] The first leg portion 148A can be continuously connected to the right-left intermediate portion of the front end guard portion 148a.

[2-4] The second leg portion 148B can be continuously connected to the right-left intermediate portion of the rear end guard portion 148b.

[2-5] Aside from the tractor described above, the riding work vehicle can also be a riding work vehicle such as riding grass mower and a riding rice planter, including a driving section having a driver's seat, right and left rear fenders disposed at positions laterally of the driver's seat and having top plates used also as mounts, and right and left guard members for preventing fall of an object from the right and left top plates to the outside.

Incidentally, the above-described first embodiment, the second embodiment, the modified embodiments of the first embodiment and the modified embodiments of the second embodiment can be selectively combined as long as no contraction results from such combinations. With this, various embodiments can be configured. Also, the scope of the present invention is not limited to the contents of the respective embodiments as described above.

DESCRIPTION OF REFERENCE MARKS/NUMERALS

First Embodiment

7: rear fender
7A: mounting face
18: PTO shaft
19B: PTO clutch
20: traveling speed changer device
25: operational lever (inner operational lever, speed changer lever)
25A: grip portion
26: operational lever (outer operational lever, PTO clutch lever)
26A: grip portion
28: driver's seat
30: support shaft Second Embodiment 104: driving section
107: rear fender
128: driver's seat
147: top plate
147A: flat face portion
147B: front side extension portion
147C: rear side extension portion
148: guard member
148A: first leg portion
148B: second leg portion
148C: guard portion
148a: front end guard portion
148b: rear end guard portion

What is claimed is:
1. A riding work vehicle comprising:
a driver's seat;
right and left rear fenders disposed at positions on respective lateral sides of the driver's seat; and
a plurality of operational levers;
a traveling speed changer device; and
a PTO clutch for selectively allowing or blocking power transmission to a PTO shaft that is configured to take off power for performing implement work,
wherein the plurality of operational levers are disposed in right/left juxtaposition to each other between the driver's seat and one of the right and left rear fenders;

the plurality of operational levers include an inner operational lever that is disposed adjacent the driver's seat to be displaceable in a front-rear direction of a vehicle body; and the plurality of operational levers include an outer operational lever that is disposed adjacent said one rear fender, the outer operational lever having an entire grip portion thereof disposed more upwardly of the vehicle body than a grip portion of the inner operational lever, the outer operational lever being displaceable in the front-rear direction of the vehicle body between a first operational position on more vehicle body front side than a front-rear operational range of the inner operational lever, and a second operational position on more vehicle body rear side than the front-rear operational range of the inner operational lever, the outer operational lever being position-retainable at the first operational position and the second operational position;

each of the outer operational lever and the inner operational lever is configured to pivot in the vehicle body front-rear direction about a common support shaft oriented in the right-left direction;

the outer operational lever has a length greater than the inner operational lever;

the inner operational lever comprises a speed changer lever that allows a speed changing operation of the speed changer device; and the outer operational lever comprises a PTO clutch lever that allows a clutching/declutching operation of the PTO clutch.

2. The riding work vehicle as defined in claim 1, wherein:
the outer operational lever is configured such that a posture of the grip portion is set under a posture sloped toward the driver's seat, with an upper side of the grip portion being located more toward the driver's seat.

3. The riding work vehicle as defined in claim 1, wherein:
each of the rear fenders includes a mounting face at an upper end thereof; and
the outer operational lever has an upper end thereof disposed lower than the mounting face relative to the vehicle body.

4. A riding work vehicle comprising:
a driving section having a driver's seat;
right and left rear fenders disposed at positions laterally of the driver's seat, each of the fenders having a top plate acting also as a mount; and
right and left guard members for preventing fall of an object from the right and left top plates to the outside;
wherein each of the right and left top plates includes a horizontal flat face portion, a front side extension portion that extends forwardly downwards from a front end of the flat face portion, and a rear side extension portion that extends rearwardly downwards from a rear end of the flat face portion;
each of the right and left guard members includes a first leg portion on the front side that extends upwards from the front side extension portion, a second leg portion on the rear side that extends upwards from the rear side extension portion, and a guard portion having a U-shaped as seen in its plan view that extends between the first leg portion and the second leg portion; and
a right-left oriented front end guard portion of the guard portion is disposed on more vehicle body front side than a front end of the flat face portion and a right-left oriented rear end guard portion of the guard portion is disposed on more vehicle body rear side than a rear end of the flat face portion.

5. The riding work vehicle as defined in claim 4, wherein:
the first leg portion is connected continuously to an end portion of the front end guard portion on the driver's seat side.

6. A riding work vehicle comprising:
a driver's seat;
right and left rear fenders disposed at positions on respective lateral sides of the driver's seat; and
a plurality of operational levers;
wherein the plurality of operational levers are disposed in right/left juxtaposition to each other between the driver's seat and one of the right and left rear fenders;
the plurality of operational levers include an inner operational lever that is disposed adjacent the driver's seat to be displaceable in a front-rear direction of a vehicle body; and
the plurality of operational levers include an outer operational lever that is disposed adjacent said one rear fender, the outer operational lever having an entire grip portion thereof disposed more upwardly of the vehicle body than a grip portion of the inner operational lever, the outer operational lever being displaceable in the front-rear direction of the vehicle body between a first operational position on more vehicle body front side than a front-rear operational range of the inner operational lever, and a second operational position on more vehicle body rear side than the front-rear operational range of the inner operational lever, the outer operational lever being position-retainable at the first operational position and the second operational position; and
wherein the outer operational lever is configured such that a posture of the grip portion is set under a posture sloped toward the driver's seat, with an upper side of the grip portion being located more toward the driver's seat.

7. The riding work vehicle as defined in claim 6, wherein:
each of the outer operational lever and the inner operational lever is configured to pivot in the vehicle body front-rear direction about a common support shaft oriented in the right-left direction; and
the outer operational lever has a length greater than the inner operational lever.

8. The riding work vehicle as defined in claim 6, wherein:
each of the rear fenders includes a mounting face at an upper end thereof; and
the outer operational lever has an upper end thereof disposed lower than the mounting face relative to the vehicle body.

9. A riding work vehicle comprising:
a driver's seat;
right and left rear fenders disposed at positions on respective lateral sides of the driver's seat; and
a plurality of operational levers;
wherein the plurality of operational levers are disposed in right/left juxtaposition to each other between the driver's seat and one of the right and left rear fenders;
the plurality of operational levers include an inner operational lever that is disposed adjacent the driver's seat to be displaceable in a front-rear direction of a vehicle body; and
the plurality of operational levers include an outer operational lever that is disposed adjacent said one rear fender, the outer operational lever having an entire grip portion thereof disposed more upwardly of the vehicle body than a grip portion of the inner operational lever, the outer operational lever being displaceable in the front-rear direction of the vehicle body between a first operational position on more vehicle body front side than a front-rear operational range of the inner operational lever, and a second operational position on more vehicle body rear side than the front-rear operational range of the inner operational lever, the outer operational lever being position-retainable at the first operational position and the second operational position; and wherein each of the rear fenders includes a mounting face at an upper end thereof; and the outer operational lever has an upper end thereof disposed lower than the mounting face relative to the vehicle body.

10. The riding work vehicle as defined in claim 9, wherein:

each of the outer operational lever and the inner operational lever is configured to pivot in the vehicle body front-rear direction about a common support shaft oriented in the right-left direction; and the outer operational lever has a length greater than the inner operational lever.

* * * * *